United States Patent
Ferguson et al.

(10) Patent No.: US 10,633,001 B2
(45) Date of Patent: Apr. 28, 2020

(54) VEHICLE TELEMATICS BASED DRIVING ASSESSMENT

(71) Applicant: Allstate Insurance Company, Northbrook, IL (US)

(72) Inventors: Dana Ferguson, Chicago, IL (US); Jared S. Snyder, Chicago, IL (US); Anna Yum-Wai-Shan Chou, Palo Alto, CA (US); Craig Chang, Menlo Park, CA (US); Aaron D. Daly, Belmont, CA (US); William F. Polisson, Jr., Vernon Hills, IL (US)

(73) Assignee: Allstate Insurance Company, Northbrook, IL (US)

( * ) Notice: Subject to any disclaimer, the term of this patent is extended or adjusted under 35 U.S.C. 154(b) by 195 days.

(21) Appl. No.: 15/613,919

(22) Filed: Jun. 5, 2017

(65) Prior Publication Data
US 2018/0345981 A1 Dec. 6, 2018

(51) Int. Cl.
*B60W 40/09* (2012.01)
*G07C 5/08* (2006.01)
(Continued)

(52) U.S. Cl.
CPC .............. *B60W 40/09* (2013.01); *G07C 5/008* (2013.01); *G07C 5/02* (2013.01); *G07C 5/0808* (2013.01); *G07C 5/0841* (2013.01); *G06Q 40/08* (2013.01)

(58) Field of Classification Search
CPC ......... B60W 40/09; G07C 5/008; G07C 5/02; G07C 5/0808; G06Q 40/08
See application file for complete search history.

(56) References Cited

U.S. PATENT DOCUMENTS 8,024,111 B1   9/2011   Meadows et al.
8,140,358 B1 *  3/2012   Ling ..................... G06Q 40/08
                                                           705/4
(Continued)

OTHER PUBLICATIONS

"The World Should Get Ready for a FICO-type Score of Driving: Creating a Uniform Standard of Scrogin Similar to a FICO Scor for Driving Behavior and Risk Assessment," Accuscore, Our Blog, Dec. 9, 2015, retrieved from http://accuscore.xyz/the-world-should-get-ready-for-a-fico-type-score-of-driving, 8 pages.

(Continued)

*Primary Examiner* — Darlene P Condra
(74) *Attorney, Agent, or Firm* — Banner & Witcoff, Ltd.

(57) ABSTRACT

Aspects of the disclosure relate to using vehicle telematics data to assess parameters associated with vehicle operation. In some instances, a driving assessment system may include a first computing device associated with a user in a vehicle and a second computing located remotely from the first computing device. The first computing device may collect, by way of one or more of an accelerometer and global positioning system (GPS), vehicle operational data and vehicle locational information associated with the vehicle and corresponding to a trip of the vehicle and may transmit such information to the second computing device. The second computing device may identify actionable and second order actionable trip data from the vehicle operational data and vehicle locational information and may calculate a behavior score for the trip.

17 Claims, 10 Drawing Sheets

(51) Int. Cl.
*G07C 5/02* (2006.01)
*G07C 5/00* (2006.01)
*G06Q 40/08* (2012.01)

(56) References Cited

U.S. PATENT DOCUMENTS

| | | | |
|---|---|---|---|
| 8,606,512 | B1 | 12/2013 | Bogovich et al. |
| 9,086,292 | B2 | 7/2015 | Horvitz et al. |
| 9,141,582 | B1 | 9/2015 | Brinkmann et al. |
| 9,141,995 | B1 | 9/2015 | Brinkmann et al. |
| 9,344,683 | B1 | 5/2016 | Nemat-Nasser et al. |
| 9,361,599 | B1 | 6/2016 | Biemer et al. |
| 9,390,452 | B1 | 7/2016 | Biemer et al. |
| 9,418,382 | B2 | 8/2016 | Gryan et al. |
| 9,524,269 | B1 | 12/2016 | Brinkmann et al. |
| 9,574,888 | B1 | 2/2017 | Hu et al. |
| 2006/0053038 | A1 | 3/2006 | Warren et al. |
| 2010/0238009 | A1* | 9/2010 | Cook .................. G06Q 10/10 340/439 |
| 2012/0029945 | A1* | 2/2012 | Altieri .................. G06Q 40/08 705/4 |
| 2012/0053759 | A1* | 3/2012 | Lowrey .................. G01C 21/26 701/2 |
| 2012/0066007 | A1* | 3/2012 | Ferrick .................. G06Q 30/0283 705/4 |
| 2013/0046510 | A1 | 2/2013 | Bowne et al. |
| 2013/0297097 | A1 | 11/2013 | Fischer et al. |
| 2014/0012634 | A1* | 1/2014 | Pearlman .................. G09B 19/14 705/7.42 |
| 2014/0046701 | A1 | 2/2014 | Steinberg et al. |
| 2014/0199662 | A1 | 7/2014 | Armitage et al. |
| 2014/0257869 | A1 | 9/2014 | Binion et al. |
| 2014/0350970 | A1 | 11/2014 | Schumann, Jr. et al. |
| 2014/0358840 | A1* | 12/2014 | Tadic .................. B60W 40/09 706/52 |
| 2015/0025917 | A1 | 1/2015 | Stempora |
| 2015/0187016 | A1* | 7/2015 | Adams .................. G06Q 40/08 705/4 |
| 2015/0294422 | A1* | 10/2015 | Carver .................. G06Q 40/08 705/4 |
| 2016/0039426 | A1* | 2/2016 | Ricci .................. H04W 4/21 701/1 |
| 2017/0041737 | A1* | 2/2017 | Fischer .................. H04W 64/006 |
| 2017/0099582 | A1 | 4/2017 | Boesen |

OTHER PUBLICATIONS

"The Risk of Using a Mobile Phone While Driving," The Royal Society for the Prevention of Accidents, retrieved from https://www.vicroads.vic.gov.au/~/media/files/documents/safety-and-road-rules/theriskofusingamobilephonewhiledriving.pdf, 40 pages.

Soltani, et al, "Driver Risk Assessment Model Considering Trip Characteristics Using Insurance Data System," Procedia Engineering 161 (2016), pp. 1160-1165.

Nov. 5, 2018—(WO) International Search Report & Written Opinion—PCT/US2018/36087.

* cited by examiner

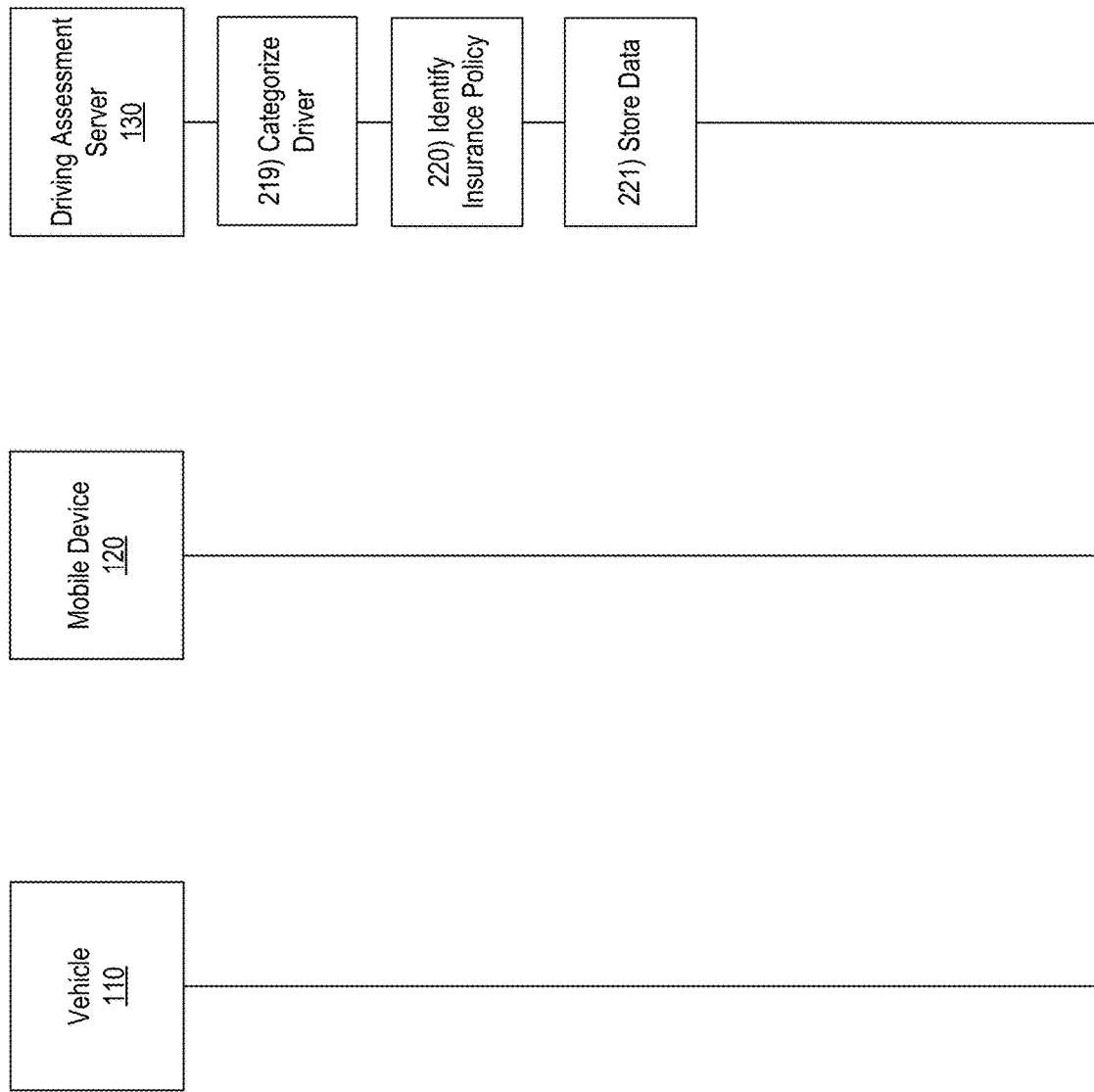

VEHICLE TELEMATICS BASED DRIVING ASSESSMENT

FIELD

Aspects described herein are generally related to systems and devices for driving assessment. More specifically, aspects described herein relate to using vehicle telematics data to assess parameters associated with vehicle operation.

BACKGROUND

People and organizations are interested in collecting vehicle telematics data. Vehicle telematics data includes various data from measurements related to a vehicle's operation. For example, vehicle telematics data may include global positioning system (GPS) coordinates of an automobile that allow the location of the automobile to be tracked. Also, for example, vehicle telematics data may include acceleration data of an automobile that allow the speed of the automobile to be tracked. Vehicle telematics data may include other vehicle operational data as well. Auto-insurance companies are interested in this information because they would like to evaluate the risk associated with customers and potential customers. Other organizations may also be interested in such information to determine a person's behavior. Moreover, parents or other guardians may also be interested in monitoring a vehicle carrying their children or other dependents.

Some vehicles have been equipped with devices for collecting some vehicle telematics data. However, this vehicle telematics data might not be obtained by people and/or organizations remote from the vehicle in real time or while a vehicle is moving. Moreover, vehicle telematics data might not be evaluated in real time or while the vehicle is moving so it may be difficult for people and organizations to take action in response to the vehicle telematics data in a timely manner. In some cases, people or organizations wishing to monitor a vehicle may be unaware that the vehicle is in use (e.g., moving).

As technology advances and adoption of such technology increases, more and more vehicle telematics data may be collected and more and more people may desire access to this data. As such, challenges for making this vehicle telematics data user-friendly and readily accessible may emerge. Specifically, challenges may include implementing a manner for regulating an amount of vehicle telematics data collected, for organizing this data, and for controlling when, how, and what data is reported. Different people and different organizations may want different information reported to them. As more vehicle telematics data becomes available, it becomes more difficult to strike a balance between providing too much information and too little information. On one hand, reporting too much information may cause people and organizations to ignore desired information, and therefore, may be detrimental to the effectiveness of monitoring vehicle behavior. On the other hand, reporting too little information may cause false alarms or unnecessary concern for people and organizations that are monitoring a vehicle.

Accordingly, new systems, devices, methodologies, and the like are desired to collect and communicate vehicle telematics data. Further, new systems, devices, methodologies, and the like are desired to evaluate and share the vehicle telematics data in real time or while a vehicle is moving. In particular, new systems, devices, methodologies, and the like are desired to provide people and organizations with the ability to monitor vehicle behavior and respond to vehicle behavior in a timely manner (e.g., in real time or while the vehicle is moving). For example, parents may desire a tool for monitoring a vehicle carrying their teenage son or teenage daughter. Further, as mentioned above, different people and different organizations may want different information, and thus, new systems, devices, methodologies, and the like are desired to allow people and organizations control over when, how, and what information is reported.

BRIEF SUMMARY

Aspects of the disclosure address these and/or other technological shortcomings by using vehicle telematics data to assess parameters associated with vehicle operation. In particular, one or more aspects of the disclosure provide effective, efficient, scalable, and convenient technical solutions that address and overcome the technical problems associated with driving assessment systems.

In accordance with one or more embodiments, a driving assessment system may include a first computing device associated with a user in a vehicle and a second computing device located remotely from the first computing device. The first computing device having at least a first processor, first long-range communication interface, first accelerometer, first global positioning system (GPS), and first memory may collect, by one or more of the first accelerometer and the first GPS, vehicle operational data and vehicle locational information associated with the vehicle and corresponding to a trip of the vehicle. The first computing device may transmit, by the first long-range communication interface to the second computing device, the vehicle operational data and vehicle locational information associated with the vehicle. The second computing device having a second processor, second communication interface, and second memory may receive the vehicle operational data and vehicle locational information from the first computing device via the second communication interface. The second computing device may identify, based on the vehicle operational data and vehicle locational information, one or more of destination information corresponding to the trip, a time range of the trip, velocity events that occurred during the trip, and braking events that occurred during the trip. The second computing device may determine a type of location associated with the destination information and calculate, based on one or more of the type of location, the time range, velocity events, and braking events, a behavior score for the trip.

In some embodiments, the first computing device of the driving assessment system may further include a first short-range communication interface and may pair with a communication interface associated with the vehicle via the first short-range communication interface. The first computing device may receive, by the first short-range communication interface and from the vehicle, an indication of a positive vehicle ignition event. Responsive to receiving the indication of the positive vehicle ignition event, the first computing device may activate a driving assessment application on the first computing device and may collect, by one or more of the first accelerometer and the first GPS, vehicle operational data and vehicle locational information associated with the vehicle and corresponding to the trip of the vehicle via the driving assessment application.

In some embodiments, the first computing device of the driving assessment system may receive, by the first short-range communication interface and from the vehicle, an indication of a negative vehicle ignition event and may deactivate the driving assessment application.

In some embodiments, the first computing device of the driving assessment system may identify, from the collected vehicle operational data, one or more periods in which the vehicle had a velocity greater than a first predetermined velocity threshold, determine a number of unlocking events of the first computing device during the one or more periods, and transmit, by the first long-range communication interface to the second computing device, the number of unlocking events of the first computing device during the one or more periods.

In some embodiments, the second computing device of the driving assessment system may receive, by the second communication interface and from the first computing device, the number of unlocking events of the first computing device during one or more periods and may use the number of unlocking events of the first computing device during one or more periods in calculating the behavior score.

In some embodiments, the second computing device of the driving assessment system may identify, based on the vehicle operational data and vehicle locational information, a time of day associated with the trip, a day of week associated with the trip, and a number of miles traveled during the night and may use such information in calculating the behavior score.

In some embodiments, the second computing device of the driving assessment system may identify, based on the vehicle operational data and vehicle locational information, an amount of time the vehicle traveled greater than a second predetermined velocity threshold and a number of braking events greater than a predetermined deceleration threshold when the velocity of the vehicle was greater than a third predetermined velocity threshold and may use such information in calculating the behavior score.

In some embodiments, the second computing device of the driving assessment system may determine, based on the vehicle locational information, one or more roads the vehicle travelled on during the trip, identify, based on the one or more roads, speed limits associated with each of the one or more roads, and compare the vehicle operational data with the speed limits associated with each of the one or more roads to identify a percentage of miles driven by the vehicle during the trip where a velocity of the vehicle was greater than a fourth predetermined velocity threshold over a corresponding speed limit. The second computing device may use such information in calculating the behavior score.

In some embodiments, the second computing device of the driving assessment system may identify, based on the vehicle locational information, starting information corresponding to the trip and may compare the starting information with the destination information to determine a straight-line distance associated with the trip. The second computing device may determine, based on the vehicle locational information, a total distance travelled by the vehicle during the trip, calculate a ratio between the straight-line distance associated with the trip and the total distance travelled by the vehicle during the trip, and use the ratio in calculating the behavior score.

These features, along with many others, are discussed in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 2A, 2B, 2C, 2D, and 2E depict an illustrative event sequence for vehicle telematics based driving assessment in accordance with one or more aspects of the disclosure;

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. In addition, aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1A:
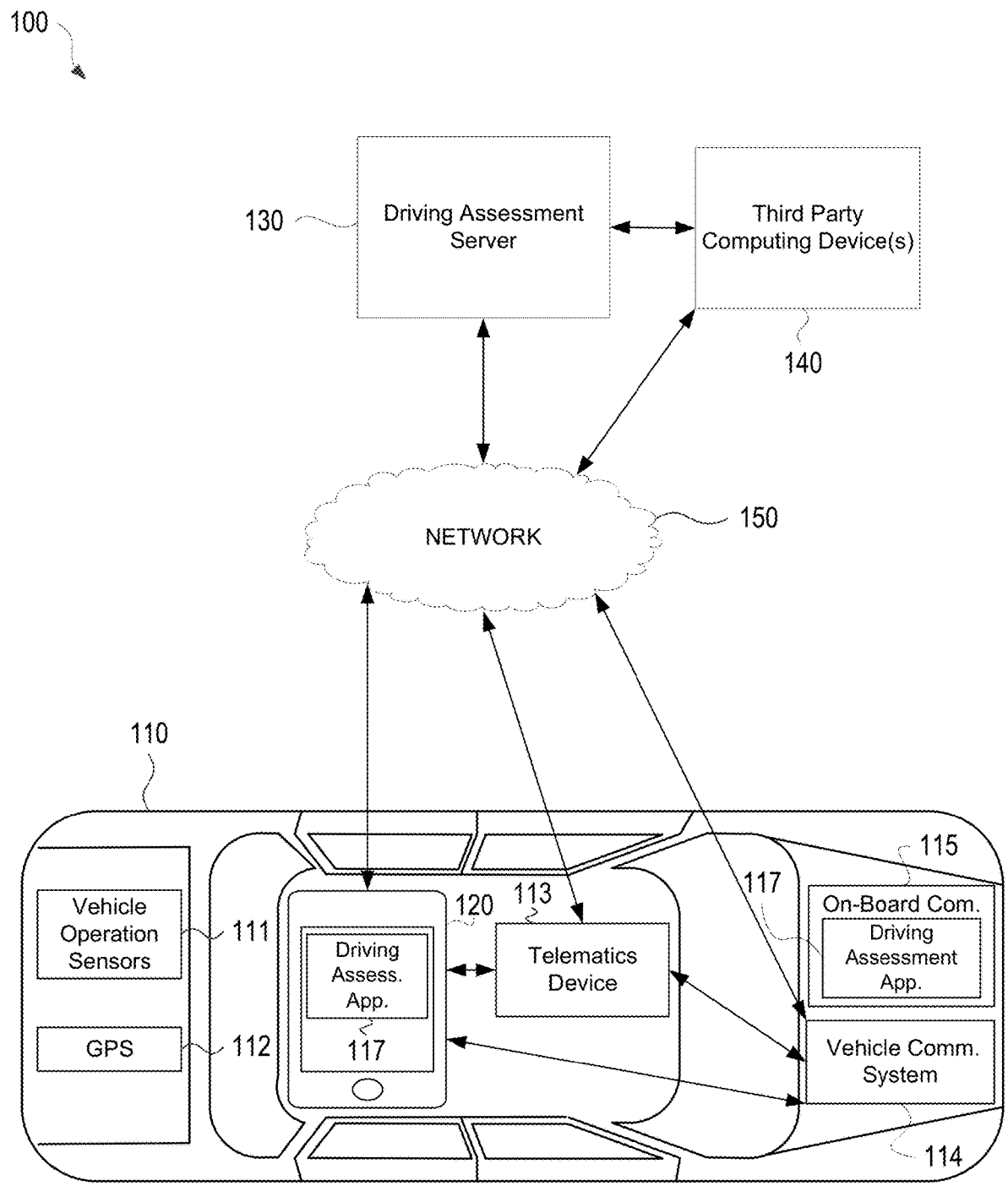
FIGS. 1A and 1B depict an illustrative computing environment for vehicle telematics based driving assessment in accordance with one or more aspects of the disclosure.

FIG. 1A depicts an illustrative computing environment for vehicle telematics based driving assessment in accordance with one or more aspects of the disclosure. The driving assessment system 100 may include vehicle 110, driving assessment server 130, and one or more third party computing devices 140. The vehicle 110 may include one or more components associated therewith such as vehicle operation sensors 111, GPS 112, telematics device 113, vehicle communication system 114, on-board computer 115, and the like. Additionally, mobile computing device 120 may be included in vehicle 110. In some instances, the mobile device 120 may be associated with an owner, driver, or passenger of vehicle 110. Although FIG. 1A illustrates only one vehicle 110, the driving assessment 100 may be configured to communicate with multiple vehicles 110 and associated components.

The vehicle 110 and one or more components associated therewith (e.g., vehicle operation sensors 111, GPS 112, telematics device 113, vehicle communication system 114, on-board computer 115, and the like), mobile device 120, driving assessment server 130, and one or more third party computing devices 140 may be configured to communicate with each other through network 150. Each component shown in FIG. 1A may be implemented in hardware, software, or a combination of the two. Additionally, each component of the driving assessment system 100 may include a computing device (or system) having some or all of the structural components described below in regard to computing device 401 of FIG. 4.

Vehicle 110 of the driving assessment system 100 may be an automobile, motorcycle, scooter, bus, van, truck, semi-truck, train, boat, recreational vehicle, or other vehicle. The vehicle 110 may further be an autonomous vehicle, semi-autonomous vehicle, or non-autonomous vehicle. In some examples, vehicle 110 may include vehicle operation/performance sensors 111 capable of detecting, recording, and transmitting various vehicle performance and/or operational data. For example, sensors 111 may detect, store, and transmit data corresponding to the vehicle's speed, rates of acceleration and/or deceleration, braking, swerving, and the like. Sensors 111 also may detect, store and/or transmit data received from the vehicle's internal systems, such as impact to the body of the vehicle, air bag deployment, headlight usage, brake light operation, door opening and closing, door locking and unlocking, cruise control usage, hazard light usage, windshield wiper usage, horn usage, turn signal usage, seat belt usage, phone and radio usage within the vehicle, internal decibel levels, and other data collected by the vehicle's computer systems.

Sensors 111 also may detect, store, and/or transmit data relating to moving violations and the observance of traffic signals and signs by the vehicle 110. Additional sensors 111 may detect, store, and transmit data relating to the maintenance of the vehicle 110, such as the engine status, oil level, engine coolant temperature, odometer reading, level of fuel in the fuel tank, engine revolutions per minute (RPMs), and/or tire pressure. The sensors 111 of vehicle 110 may further include one or more cameras and proximity sensors capable of recording additional conditions inside or outside of the vehicle 110. Internal cameras may detect conditions such as the number of the passengers in the vehicle 110, and potential sources of driver distraction within the vehicle (e.g., pets, phone usage, and unsecured objects in the vehicle). External cameras and proximity sensors may be configured to detect nearby vehicles, vehicle spacing, traffic levels, road conditions and obstacles, traffic obstructions, animals, cyclists, pedestrians, precipitation levels, light levels, sun position, and other conditions that may factor into driving operations of vehicle 110.

Additionally, vehicle sensors 111 may be configured to independently transmit the above-mentioned data to one or more computing devices and/or systems including telematics device 113, on-board computer 115, mobile device 120, driving assessment server 130, and/or third party computing devices 140. In some instances, the data transmission to the mobile device 120, driving assessment server 130, and/or third party computing device(s) 140 may be performed via on-board computer 115. In such cases, the on-board computer 115 may be configured to transmit the data received from vehicle sensors 111 to mobile device 120, driving assessment server 130, and/or third party computing device(s) 140 by way of vehicle communication system 114.

Vehicle 110 may include a Global Positioning System (GPS) 112 which may be used to generate data corresponding to the position, heading, orientation, location, velocity, and/or acceleration of vehicle 110. GPS 112 may be configured to independently transmit the above-mentioned data to one or more computing systems including telematics device 113, on-board computer 115, mobile device 120, driving assessment server 130, and/or third party computing devices 140. In some instances, the data transmission to the mobile device 120, driving assessment server 130, and/or third party computing device(s) 140 may be performed via on-board computer 115. In such cases, the on-board computer 115 may be configured to transmit the data received from GPS 112 to mobile device 120, driving assessment server 130, and/or third party computing device(s) 140 by way of vehicle communication system 114.

Telematics device 113 may be configured to receive the vehicle performance and/or operational data and vehicle locational information in the form of a data stream from on-board computer 115 via a data port, Bluetooth interface, or any comparable communication interface of the vehicle 110. For example, telematics device 113 may include an on-board diagnostic (OBD) device adapter and may be connected to an OBD port of the vehicle 110 through which on-board computer 115 may be configured to transmit data to telematics device 113. In certain embodiments, telematics device 113 may be configured to receive vehicle performance and/or operational data and vehicle locational information directly from vehicle sensors 111, GPS 112, on-board computer 115, and/or mobile device 120 via a wired or wireless connection. Telematics device 113 may include a memory to store data received from vehicle sensors 111, GPS 112, on-board computer 115, and/or mobile device 120.

The vehicle performance and/or operational data and vehicle locational information may be collected with appropriate permissions (e.g., from the driver, vehicle owner, and the like) and may include operational data from an industry standard port such as a SAE-1962 connector, or an on board diagnostic ("OBD") port or other vehicle data acquiring component. For example, operation data accessible via the OBDII port includes speed and engine throttle position or other variable power controls of the vehicle power source. It may also include so called "extended OBDII" or OBDIII datasets that are specific to each manufacturer and also available with manufacturer permission such as velocity, acceleration, odometer readings, activation of brakes, degree and duration of steering direction, and implementation of accident avoidance devices such as turning signals, headlights, seatbelts, activation of automated braking systems (ABS), and the like. Other information regarding the operation of the vehicle may be collected such as, but not limited to, interior and exterior vehicle temperature, window displacement, exterior vehicle barometric pressure, exhaust pressure, vehicle emissions, turbo blower pressure, turbo charger RPM, vehicle GPS location, and the like. The system may recognize or be configured to recognize a particular language emitted by the vehicle system and may configure the recording component to receive or convert data in SAE J1850, ISO ISO9141 or KWP 2000 formats.

Accordingly, U.S. and/or international OBD standards may be accommodated. For instance, data may be collected from a variety of U.S. and/or international port types to permit use in a variety of locations. Alternatively, this step may be performed by a processor after the data is recorded.

Telematics device 113 may also include sensors such as, but not limited, an accelerometer, compass, gyroscope, and GPS. Additionally, telematics device 113 may include antennas to communicate with other devices wirelessly. For example, telematics device 113 may communicate with on-board computer 115, mobile device 120, driving assessment server 130, and/or third party computing device(s) 140 over a wide area network (WAN), cellular network, Wi-Fi network, and the like. Telematics device 113 may also communicate with on-board computer 115 and mobile device 120 via a Bluetooth connection. In certain embodiments, telematics device 113 may be configured to establish a secure communication link and/or channel with on-board computer 115, mobile device 120, driving assessment server 130, and/or third party computing device(s) 140.

In some arrangements, telematics device 113 may include a telematics application operating on on-board computer 115 and/or mobile computing device 120 and may utilize hardware components comprised within on-board computer 115 and/or mobile computing device 120 (e.g., memory, processors, communication hardware, sensors, and the like) to receive, store, and/or transmit vehicle performance and/or operational data and vehicle locational information.

Vehicle communication systems 114 may be vehicle-based data transmission systems configured to transmit vehicle information and/or operational data and vehicle locational information to external computing systems and/or other nearby vehicles and infrastructure, and to receive data from external computing systems and/or other nearby vehicles and infrastructure. In some examples, communication systems 114 may use the dedicated short-range communications (DSRC) protocols and standards to perform wireless communications between vehicles and/or external infrastructure such as bridges, guardrails, barricades, and the like.

Vehicle communication systems 114 may be implemented using wireless protocols such as WLAN communication protocols (e.g., IEEE 802.11), Bluetooth (e.g., IEEE 802.15.1), one or more of the Communication Access for Land Mobiles (CALM) wireless communication protocols and air interfaces, and the like. In certain systems, communication systems 114 may include specialized hardware installed in vehicle 110 (e.g., transceivers, antennas, and the like) to facilitate near field communication (NFC) and/or radio-frequency identification (RFID), while in other examples the communication systems 114 may be implemented using existing vehicle hardware components (e.g., radio and satellite equipment, navigation computers). In some instances, the vehicle communication systems 114 may be configured to transmit and receive data from vehicle sensors 111, GPS 112, telematics device 113, on-board computer 115, mobile device 120, driving assessment server 130 and/or third party computing device(s) 140 over a wide area network (WAN), cellular network, Wi-Fi network, Bluetooth, RFID, and/or NFC.

Figure 4:
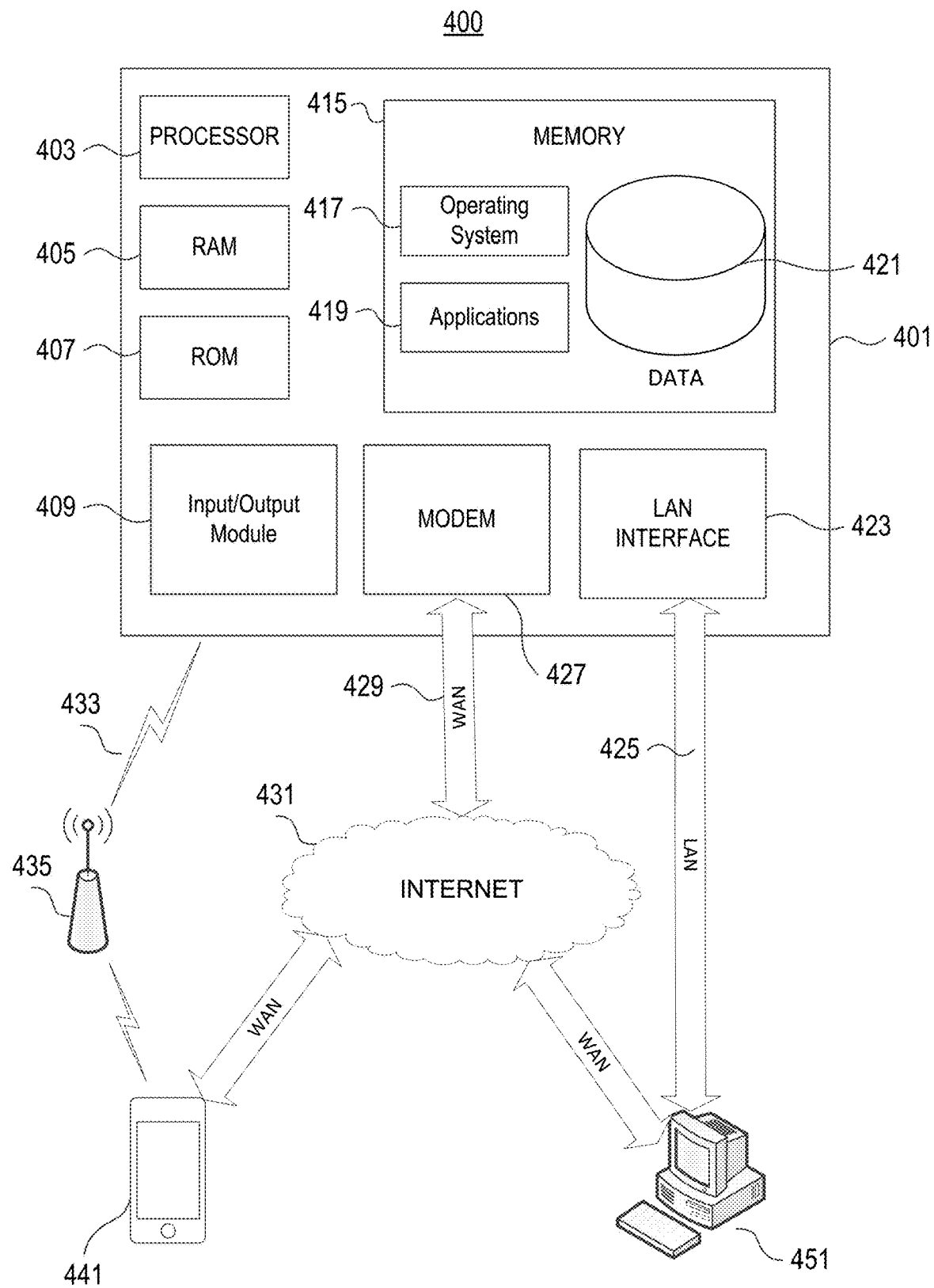
FIG. 4 illustrates a network environment and computing systems that may be used to implement one or more aspects of the disclosure.

On-board computer 115 may contain some or all of the hardware/software components as the computing device 401 of FIG. 4. Vehicle control computer 115 may be configured to operate one or more internal vehicle systems and/or components including at least a vehicle sound system, dashboard display and/or heads-up display system, output speakers, interior lighting system, climate control system, ignition system, door locking system, and the like. Similarly, on-board computer 115 may be configured to operate one or more external vehicle systems and/or components including windshield wipers, exterior lighting systems (e.g., headlights, tail lights, running lights, turn signals, emergency lights, etc.), emission and exhaust systems, fuel systems, suspension systems, transmission systems, and the like. In some instances, vehicle control computer 115 may be configured to perform the driving assessment methods as described in further detail below in conjunction with mobile computing device 120, driving assessment server 130, and/or third party computing device(s) 140.

Additionally, on-board computer 115 may include a display screen for presenting information to a driver of vehicle 110 pertaining to any of a plurality of applications such as a telematics application, driving assessment application 117, and the like. In some instances, the display screen may be a touch screen and may be configured to receive user touch input. Alternatively, the display screen may not be a touch screen and, instead, the on-board computer 115 may receive user input and provide output through one or more of the input/output modules 409 described in detail in regard to FIG. 4.

In some instances, on-board computer 115 may be configured to perform one or more of the methods and/or processes corresponding to the vehicle telematics based driving assessment as described in further detail below independently and/or in conjunction with one or more sensors and/or computing devices such as sensors 111, GPS 112, telematics device 113, mobile device 120, driving assessment server 130, and/or third party computing device(s) 140. In particular, and in regard to the illustrative event sequence for the vehicle telematics based driving assessment described in FIGS. 2A-2E and the first and second example methods for the vehicle telematics based driving assessment described in FIGS. 3A and 3B, on-board computer 115 may be configured to perform the processes in combination with, and/or independently of, vehicle 110 and corresponding components (e.g., sensors 111, GPS 112, and telematics device 113), mobile device 120, and driving assessment server 130, as well as third party computing device(s) 140 in instances in which they are used. In performing such methods, on-board computer 115 may be configured to receive, detect, store, and transmit vehicle performance and/or operational data, vehicle locational information, and/or mobile device usage data. Furthermore, on-board computer 115 may be configured to receive, store, and transmit vehicle performance and/or operational data, vehicle locational information, driving assessment data, third party data, and/or data produced during the performance of the methods corresponding to the vehicle telematics based driving assessment from sensors 111, GPS 112, telematics device 113, mobile device 120, driving assessment server 130, and/or one or more third party computing devices 140.

Mobile computing device 120 may be, for example, a mobile phone, personal digital assistant (PDA), or tablet computer associated with the driver or passenger(s) of vehicle 110. As such, mobile computing device 120 may be included within the vehicle 110 and, in some instances, may be used to independently collect vehicle performance and/or operational data, vehicle locational information, and/or mobile device usage data as well as to receive vehicle performance and/or operational data, vehicle locational information, driving assessment data, third party data, and the like from one or more computing systems (e.g., vehicle operation sensors 111, GPS 112, telematics device 113, on-board computer 115, driving assessment server 130, and/or third party computing device(s) 140). Mobile computing device 120 may be configured to transmit the independently collected vehicle performance and/or operational data, vehicle locational information, mobile device usage data, and/or the received vehicle performance and/or operational data, vehicle locational information, driving assessment data, third party data, and the like to one or more computing devices (e.g., telematics device 113, on-board computer 115, driving assessment server 130, and/or third party computing device(s) 140).

In one example, mobile computing device 120 may be configured to execute a program and/or application (e.g., telematics application, driving assessment application 117, and the like) that provides computer-executable instructions for independently detecting vehicle performance and/or operational data, vehicle locational information, and mobile device usage data and/or receiving vehicle performance and/or operational data, vehicle locational information, driving assessment data, third party data, and the like from one or more internal and/or external computing systems. With respect to independent vehicle performance and/or operational data and vehicle informational information detection and collection, mobile device 120 may be equipped with one or more accelerometers and/or GPS systems which may be accessed by the mobile computing device 120 after executing computer-executable instructions of the software program and/or application (e.g., telematics application, driving assessment application 117, and the like) to determine vehicle location (e.g., longitude, latitude, and altitude), heading (e.g., orientation), velocity, acceleration, direction, cornering (e.g., acceleration during turning), and other driving data.

The program and/or application may provide further computer-executable instructions that cause mobile device 120 to determine unlocking and/or usage in relation to the vehicle performance and/or operational data and/or vehicle locational information. In doing so, it may be determined whether a driver is driving distracted by using their mobile device while driving. Unlocking may correspond to an unlocking event which may be an occurrence of a user activating mobile device 120, inputting a passcode or biometric data, or otherwise initiating use of the mobile device 120. In some instances, the accelerometers and/or gyroscope of the mobile device 120 may be utilized identify user interaction with mobile device 120 during operation of vehicle 110. Further, the identification of user interaction with mobile device 120 via the accelerometers and/or gyroscope may incorporate machine learning algorithms.

For example, driving assessment application 117 may include executable instructions which cause mobile device 120 to determine unlocking and/or utilization when vehicle 110 is traveling above a predetermined velocity threshold (e.g., 10 mph, 25 mph, and the like), accelerating and/or decelerating above a predetermined acceleration/deceleration threshold (e.g., 30 ft/s$^2$, 60 ft/s$^2$, and the like), cornering above a predetermined acceleration/deceleration threshold (e.g., 30 ft/s$^2$, 60 ft/s$^2$, and the like), and/or at a predetermined location (e.g., school, church, restaurant, bar, and the like). In some instances, the program and/or application may provide further computer-executable instructions that cause mobile device 120 to generate a user interface to receive inputs from a user and provide outputs of the driving assessment system 100. Additionally and/or alternatively, the mobile computing device 120 may be configured to execute a web browser (e.g., an application for accessing and navigating the Internet) to access a webpage providing an interface for the driving assessment system 100.

Mobile computing device 120 may be configured to perform one or more of the methods and/or processes corresponding to the vehicle telematics based driving assessment as described in further detail below independently and/or in conjunction with one or more sensors and/or computing devices such as sensors 111, GPS 112, telematics device 113, on-board computer 115, driving assessment server 130, and/or third party computing device(s) 140. In particular, and in regard to the illustrative event sequence for the vehicle telematics based driving assessment described in FIGS. 2A-2E and the first and second example methods for the vehicle telematics based driving assessment described in FIGS. 3A and 3B, mobile device 120 may be configured to perform the processes in combination with, and/or independently of, vehicle 110 and corresponding components (e.g., sensors 111, GPS 112, telematics device 113, and on-board computer 115) and driving assessment server 130, as well as third party computing device(s) 140 in instances in which they are used. In performing such methods, mobile device 120 may be configured to detect, store, and transmit vehicle performance and/or operational data, vehicle locational information, and/or mobile device usage data. Furthermore, mobile device 120 may be configured to receive, store, and transmit vehicle performance and/or operational data, vehicle locational information, driving assessment data, third party data, and/or data produced during the performance of the methods corresponding to the vehicle telematics based driving assessment from sensors 111, GPS 112, telematics device 113, on-board computer 115, driving assessment server 130, and/or one or more third party computing devices 140.

The driving assessment system 100 may include a driving assessment server 130. The driving assessment server 130 may be a computing device containing some or all of the hardware/software components as the computing device 401 of FIG. 4. In some instances, the analysis of the vehicle performance and/or operational data, vehicle locational information, mobile device usage data, third party data, and the like, as described in further detail below, may be performed by driving assessment server 130. In such instances, any one, or combination of, sensors 111, GPS 112, telematics device 113, on-board computer 115, mobile device 120, and one or more third party computing devices 140 may transmit data to driving assessment server 130. Such data may include any of the above-mentioned vehicle performance and/or operational data, vehicle locational information, mobile device usage data, third party data, and the like. Upon receipt of the data, driving assessment server 130, alone or in combination, with mobile device 120 and/or on-board computer 115 may be able to perform the processes outlined below.

The one or more third party computing devices 140 may contain some or all of the hardware/software components as the computing device 401 of FIG. 4. Each of the one or more third party computing devices 140 may be respectively associated with a particular entity related to the management of locational information (e.g., locational information corresponding to restaurants, bars, schools, churches, banks, automated teller machines (ATMs), daycares, gyms, sporting arenas, and the like), road and highway information (e.g., locational information associated with roads and highways), traffic regulation information (e.g., street-by-street speed limit information), traffic pattern information (e.g., actual and/or expected aggregate traffic velocity data), and crime statistical data (e.g., locational information corresponding to vehicle theft, accidents, impaired driving citations, speeding citations, and the like). As such, each of the one or more third party computing devices 140 may store data corresponding to the particular entity to which it is associated. Thus, the one or more third party computing devices 140 may be configured to communicate with any one of on-board computer 115, mobile device 120, and/or driving assessment server 130 in order to provide information corresponding to the particular entity that each of the one or more third party computing devices 140 corresponds. Additionally and/or alternatively, the one or more third party databases 140 may be configured to receive and transmit data to vehicle sensors 111, GPS 112, telematics device 113, on-board computer 115, mobile device 120, and/or driving assessment server 130.

As stated above, computing environment 100 also may include one or more networks, which may interconnect one or more of vehicle 110 and the components associated therewith (e.g., vehicle operation sensors 111, GPS 112, telematics device 113, vehicle communication system 114, on-board computer 115, and the like), mobile device 120, driving assessment server 130, and one or more third party computing devices 140. For example, computing environment 100 may include network 150. Network 150 may include one or more sub-networks (e.g., local area networks (LANs), wide area networks (WANs), or the like).

Figure 1B:
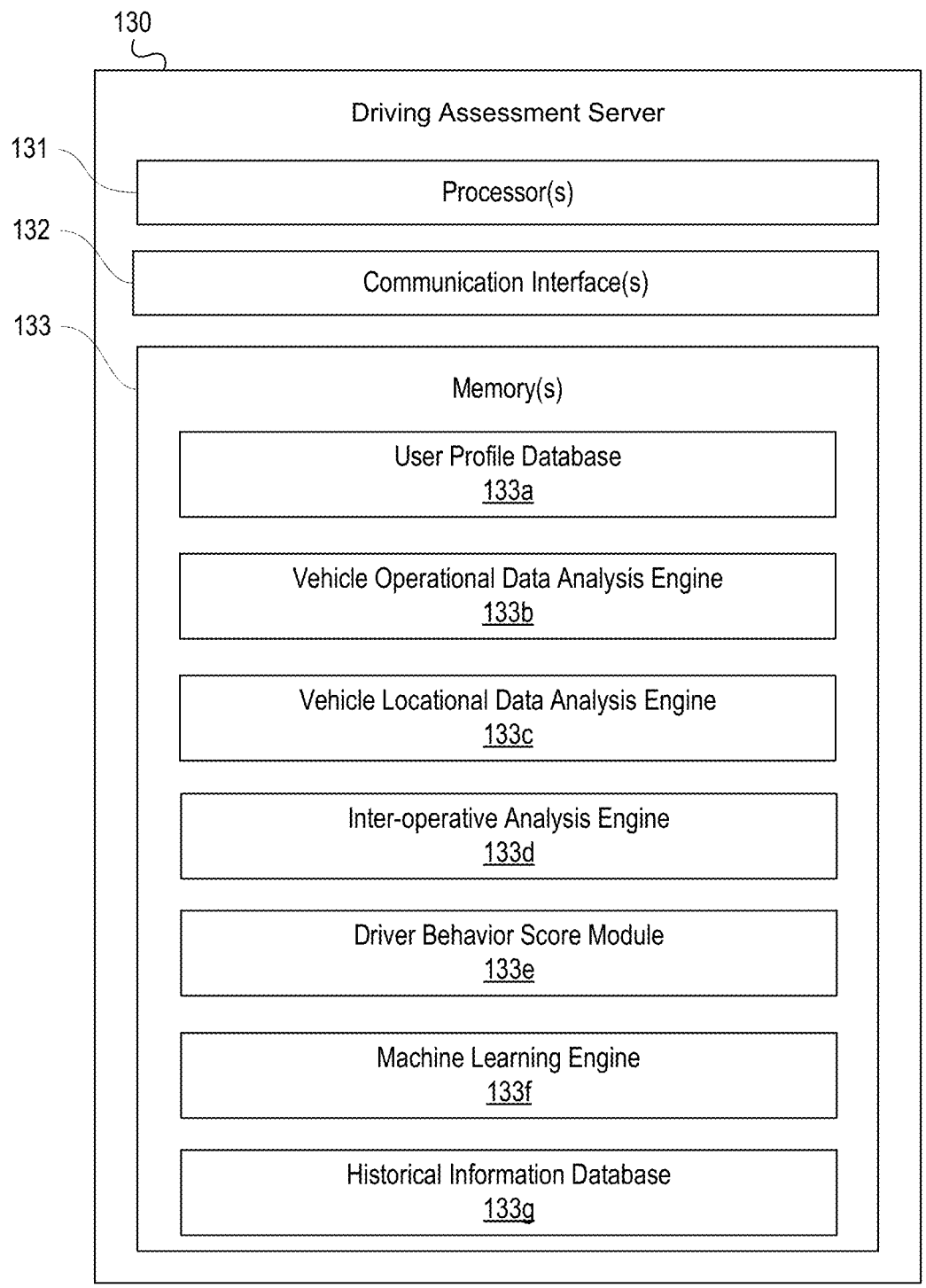

Referring to FIG. 1B, driving assessment server 130 may include processor(s) 131, communication interface(s) 132, and memory 133. A data bus may communicatively couple processor(s) 131, communication interface(s) 132, and memory 133. Communication interface(s) 132 may be a network interface configured to support communication between driving assessment server 130 and one or more networks (e.g., network 150).

Memory 133 may include one or more program modules, engines, and/or databases having instructions that when executed by processor(s) 131 cause driving assessment server 130 to perform one or more functions described herein. In some instances, the one or more program modules engines, and/or databases may be stored by and/or maintained in different memory units of driving assessment server 130. For example, memory 133 may have, store, and/or include a user profile database 133*a*, vehicle operational data analysis engine 133*b*, vehicle locational data analysis engine 133*c*, inter-operative analysis engine 133*d*, driver behavior score module 133*e*, machine learning engine 133*f*, and historical information database 133*g*.

User profile database 133*a* may store information corresponding to a user of driving assessment application 117 installed on mobile device 120 and/or on-board computing device 115. In some instances, the user of the driving assessment application 117 may be the owner of vehicle 110. Accordingly, the information stored in user profile database 133*a* may relate to insurance account information associated with the owner, vehicle information associated with the owner, financial information associated with the owner, and information as pertaining to the owner's usage of the vehicle operational data analysis engine 133*b*, vehicle locational data analysis engine 133*c*, inter-operative analysis engine 133*d*, driver behavior score module 133*e*, machine learning engine 133*f*, and historical information database 133*g*.

Vehicle operational data analysis engine 133*b* may have instructions that direct and/or cause driving assessment server 130 to receive vehicle operational data from vehicle 110 and, in particular, one or more components associated therewith (e.g., vehicle operation sensors 111, GPS 112, telematics device 113, vehicle communication system 114, on-board computer 115, and the like), as well as mobile device 120. The vehicle operational data analysis engine 133*b* may have further instructions that direct and/or cause driving assessment server 130 to identify velocity events (e.g., velocity of vehicle 110 above a predetermined velocity threshold), acceleration events (e.g., acceleration of vehicle 110 above a predetermined acceleration threshold), and/or braking events (e.g., deceleration of vehicle 110 above a predetermined deceleration threshold when the velocity of the vehicle is greater than a predetermined velocity threshold) associated with a trip.

In some instances, the identification of velocity, acceleration, and/or braking events may be related to a number of occurrences within a driving trip and/or an amount of time occurring within the driving trip. For example, vehicle operational data analysis engine 133*b* may store instructions that direct and/or cause driving assessment server 130 to identify a number of velocity events (e.g., a number of instances in which the velocity of vehicle 110 surpasses a predetermined velocity threshold during a driving trip) and/or an amount of time a velocity event occurred (e.g., an amount of time in which the velocity of vehicle 110 surpasses a predetermined velocity threshold during a driving trip).

In regard to the various predetermined thresholds associated with the velocity, acceleration, and/or braking events mentioned above, each of the thresholds of a similar type may correspond to an identical value or different values. For instance, the predetermined velocity threshold associated with the velocity event may be of a first predetermined velocity threshold value and the predetermined velocity threshold associated with the braking event may be of either an identical value to the first predetermined velocity threshold value or a different value to the first predetermined velocity threshold value.

Vehicle locational data analysis engine 133*c* may store instructions that direct and/or cause driving assessment server 130 to receive vehicle locational information from vehicle 110 and, in particular, one or more components associated therewith (e.g., vehicle operation sensors 111, GPS 112, telematics device 113, vehicle communication system 114, on-board computer 115, and the like), as well as mobile device 120. The vehicle locational data analysis engine 133*c* may have further instructions that direct and/or cause driving assessment server 130 to identify, based on the vehicle locational information, information corresponding to a trip such as starting information and destination information, a time range, a time of day, a day of week, one or more roads on which vehicle 110 travelled, a number of miles travelled, and the like. In some instances, the vehicle locational data analysis engine 133*c* include additional instructions that direct and/or cause driving assessment server 130 to determine a number of haversine miles (e.g., straight-line distance) and a total distance travelled by vehicle 110 between the starting point and destination of a trip, as well as to calculate a ratio between the haversine miles and total distance travelled by vehicle 110.

Inter-operative analysis engine 133*d* may have or include instructions that enable driving assessment server 130 to determine and/or identify, based on the destination information generated by vehicle locational data analysis engine 133*c*, a type of location (e.g., home, restaurants, bars, schools, churches, banks, ATMs, daycares, gyms, sporting arenas, and the like) associated with the destination information. Additionally, the inter-operative analysis engine 133*d* may store further instructions that direct and/or cause driving assessment server 130 to identify, based on the one or more roads identified by the vehicle locational data analysis engine 133c, speed limits associated with each of the one or more roads. Furthermore, the inter-operative analysis engine 133d may store further instructions that direct and/or cause driving assessment server 130 to compare the vehicle operational data (e.g., vehicle velocity data) with the speed limits associated with each of the one or more roads to identify a number of miles driven, percentage of miles driven, and/or time driven by the vehicle 110 during the trip where the velocity of the vehicle 110 was greater than a predetermined velocity threshold over the corresponding speed limit of the road. In some instances, such calculations may be based off of, and/or include, actual and/or expected aggregate traffic velocity data associated with each of the one or more roads identified. Such processes may be performed at driving assessment server 130 and/or with computing assistance from the third party computing device(s) 140.

Driver behavior score module 133e may store instructions that direct and/or cause driving assessment server 130 to calculate a behavior score for the driver of vehicle 110 (e.g., user of driver assessment application 117 on on-board computing device 115 and/or mobile device 120) based on the vehicle operational data and vehicle locational information, as well as the refined data generated by vehicle operational data analysis engine 133b, vehicle locational data analysis engine 133c, and/or inter-operative analysis engine 133d. In some instances, the behavior score may indicate the likelihood of the driver being involved in an accident, where a low behavior score (e.g., 1) may indicate a low probability of the driver being in an accident and a high behavior score (e.g., 100) may indicate a high probability of the driver being involved in an accident.

Additionally and/or alternatively, the behavior score may be utilized by the driving assessment server 130 to categorize the driver based on the likelihood of being involved in an accident and determine and/or identify an insurance policy for the driver based on the categorization. For example, drivers within a first range of behavior scores (e.g., 1-10) may be identified with a first class or category of insurance policies with low premiums, drivers within a second range of behavior scores (e.g., 11-20) may be identified with a second class or category of insurance policies with higher premiums than the first class, drivers within a third range of behavior scores (e.g., 21-30) may be identified with a third class or category of insurance policies with higher premiums than the second class, and so on.

In some instances, the driver behavior score module 133e may utilize machine learning algorithms from machine learning engine 133f to aide in generating the behavior scores. The machine learning engine 133f may have or include instructions that direct and/or cause driving assessment server 130 to set, define, and/or iteratively redefine parameters, rules, and/or other settings stored in historical information database 133g and used by driver behavior score module 133e in generating the driver behavior scores. As such, a behavior score associated with a driver may dynamically reflect the likelihood of the driver being involved in an accident based on the variables provided in the vehicle operational data and vehicle locational information, as well as the refined data generated by vehicle operational data analysis engine 133b, vehicle locational data analysis engine 133c, and/or inter-operative analysis engine 133d. Accordingly, the driver behavior score and the machine learning algorithms used to calculate the score may vary on a trip by trip basis.

Driver behavior score module 133e may calculate the driver behavior score on a trip by trip basis based on the vehicle operational data and vehicle locational information for each particular trip and/or over a plurality of trips. For example, vehicle operational data and vehicle locational information may be aggregated for a vehicle, operator, and/or all vehicles and/or operators on an insurance policy over all driving trips over a predetermined period of time (e.g., day, week, month, year, etc.). Additionally and/or alternatively, vehicle operational data and vehicle locational information may be aggregated for a vehicle, operator, and/or all vehicles and/or operators on an insurance policy over a predetermined number of trips (e.g., 50 trips, 100 trips, 1000 trips, etc.). As such, the driver behavior score may be reflective of driver behavior on a trip by trip basis, over the predetermined period of time, and/or over the predetermined number of trips. While the description provided below describes identifying the driver behavior score in regard to a particular driving trip, it is contemplated that the trip may be one of a plurality of trips taken over the predetermined period of time and/or within the predetermined number of trips and that the behavior score may be calculated for the predetermined period of time and/or for the predetermined number of trips.

Historical information database 133g may be configured to store historical data corresponding to vehicle operational data and vehicle locational information of previous trips, the data produced by the vehicle operational data analysis engine 133b, vehicle locational data analysis engine 133c, and/or inter-operative analysis engine 133d based of the vehicle operational data and vehicle locational information of the previous trips, as well as behavior scores associated with such trips. As stated above, in some instances, such data may be utilized by machine learning engine 133f to calibrate machine learning algorithms used by driver behavior score module 133e in calculating the driver behavior scores. The historical information database 113g may also store information related to the management of locational information (e.g., locational information corresponding to restaurants, bars, schools, churches, banks, ATMs, daycares, gyms, sporting arenas, and the like), road and highway information (e.g., locational information associated with roads and highways), traffic regulation information (e.g., street-by-street speed limit information), and crime statistical data (e.g., locational information corresponding to vehicle theft, accidents, drunk driving citations, speeding citations, and the like).

FIGS. 2A, 2B, 2C, 2D, and 2E depict an illustrative event sequence for vehicle telematics based driving assessment in accordance with one or more aspects of the disclosure. The event sequence described below in regard to FIGS. 2A, 2B, 2C, 2D, and 2E may include processing steps performed in response to a user creating an account with the driving assessment application 117 installed on mobile device 120 and/or on-board computing device 115. While the steps shown in FIGS. 2A, 2B, 2C, 2D, and 2E are presented sequentially, the steps need not follow the sequence presented and may occur in any order. Moreover, the steps described below as being performed by mobile device 120 and driving assessment server 130 may be performed by any one, or combination of, on-board computing device 115, mobile device 120, and driving assessment server 130. Further, for each variable of the actionable trip data and/or the second order actionable trip data, a value may be calculated corresponding to a number (e.g. quantity of occurrences), ratio, percentage, duration, amount, range, and the like.

Figure 2A:
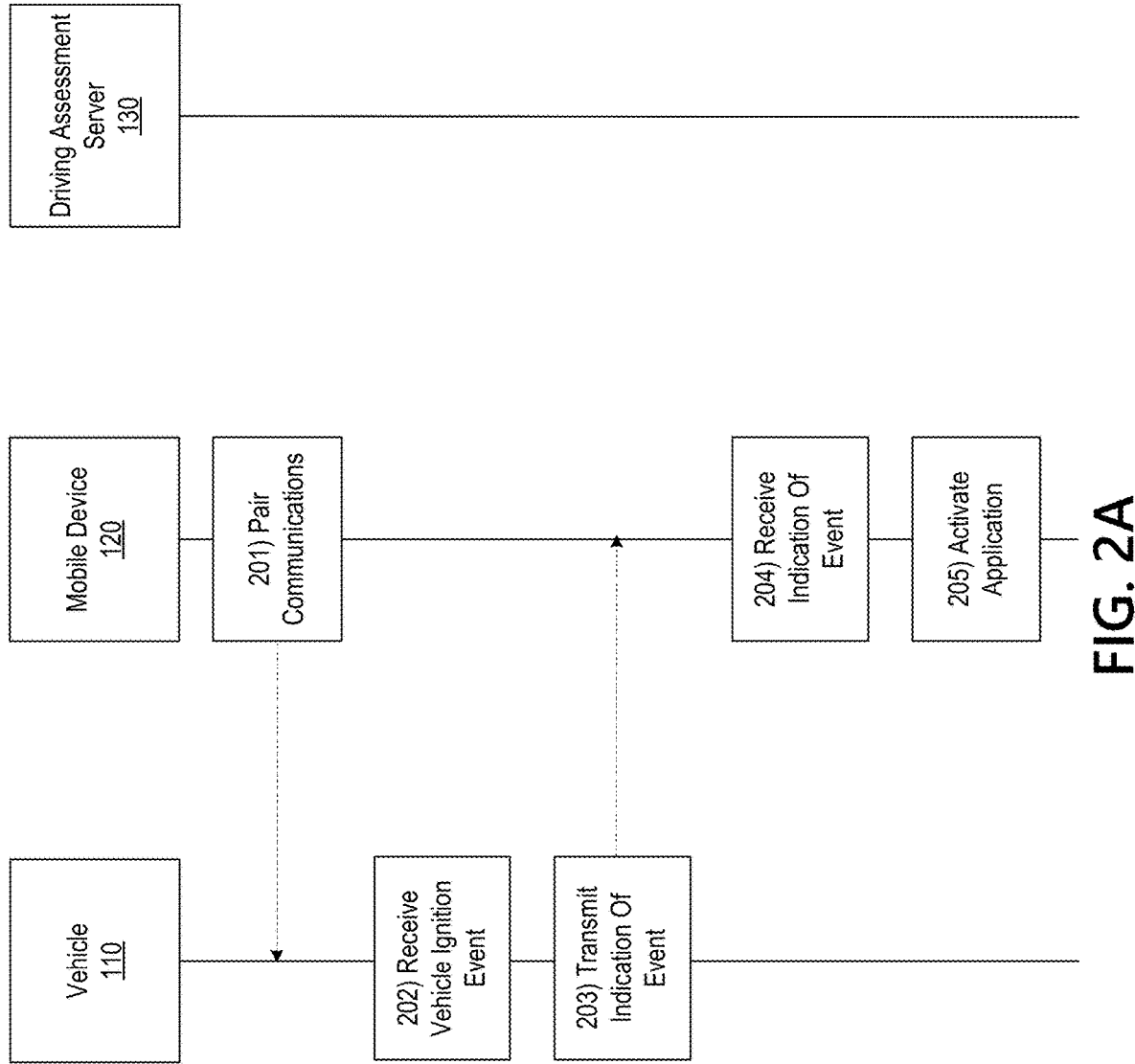

Referring to FIG. 2A, at step 201, mobile device 120 may pair, via a short-range communication interface (e.g., Bluetooth, Bluetooth Low Energy, near-field communication (NFC), radio frequency identification (RFID), and the like), with one or more of vehicle sensors 111, GPS 112, telematics device 113, and/or on-board computer 115 of vehicle 110 by way of a comparable short-range communication interface associated with the one or more of vehicle sensors 111, GPS 112, telematics device 113, and/or on-board computer 115. At step 202, vehicle 110 may receive a positive vehicle ignition event (e.g., key turn and/or button press turning engine on) from a driver of vehicle 110. As stated above, the driver of vehicle 110 may be associated with mobile device 120. At step 203, one or more of vehicle sensors 111, GPS 112, telematics device 113, and/or on-board computer 115 of vehicle 110 may transmit an indication of the positive vehicle ignition event to mobile device 120. The transmission may be performed through the communication interface paired at step 201. At step 204, the mobile device 120 may receive the indication of the positive vehicle ignition event from one or more of vehicle sensors 111, GPS 112, telematics device 113, and/or on-board computer 115 of vehicle 110 through the paired short-range communication interface. In some instances, the indication of the positive vehicle ignition event may further serve as an indication of trip commencement.

Additionally and/or alternatively, other measures may be used to identify the commencement of a vehicle trip. For example, processes such as geofencing, fused sensing, GPS-based speed threshold analysis, and the like may be used alone or in combination to identify trip commencement. Further, such processes may be analyzed through machine learning algorithms to filter out false trips and identify true trip commencement.

In any event, at step 205, the mobile device 120 may launch and/or activate the driving assessment application 117 in response to receiving the indication of the positive vehicle ignition event and/or the other processes used in identifying trip commencement. In some instances, the mobile device 120 may launch and/or activate the driving assessment application 117 in response to a direct input provided to mobile device 120 by the driver of vehicle 110. In such instances, steps 201-204 may be omitted.

Figure 2B:
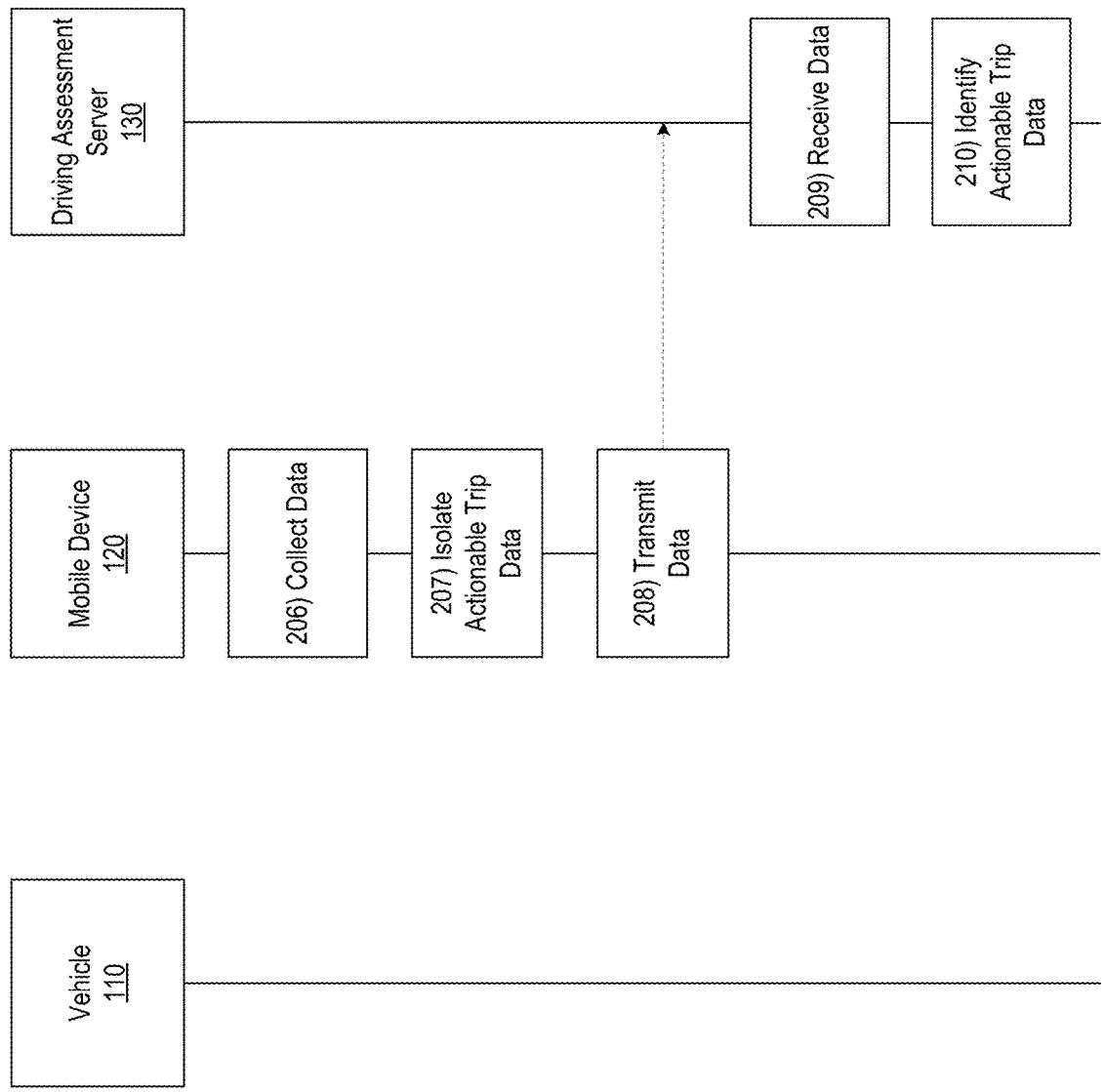

Referring to FIG. 2B, at step 206, mobile device 120 may collect vehicle operational data and vehicle locational information associated with vehicle 110 and corresponding to a trip of the vehicle 110 through the driving assessment application 117. In some instances, the vehicle operational data and vehicle locational information may be collected by way of one or more accelerometers and/or GPS systems of the mobile device 120. Additionally and/or alternatively, the mobile device 120 may receive the vehicle operational data and vehicle locational information associated with vehicle 110 from one or more of vehicle sensors 111, GPS 112, telematics device 113, and/or on-board computer 115 by way of vehicle communication system 114 of vehicle 110 through the paired short-range communication interface.

At step 207, the driving assessment application 117 may instruct the mobile device 120 to isolate actionable trip data from the vehicle operational data and the vehicle locational information. In particular, the mobile device 120 may isolate vehicle operational data corresponding to the trip relating to velocity events (e.g., velocity of vehicle 110 above a predetermined velocity threshold), acceleration events (e.g., acceleration of vehicle 110 above a predetermined acceleration threshold), and/or braking events (e.g., deceleration of vehicle 110 above a predetermined deceleration threshold when the velocity of the vehicle is greater than a predetermined velocity threshold), as well as unlocking events of the mobile device 120 during one or more periods in which the vehicle 110 had a velocity greater than a predetermined velocity threshold. The mobile device 120 may isolate vehicle locational information corresponding to the trip such as starting and destination information, a time range, a time of day, a day of week, miles traveled during the night, total miles traveled, route data, roads travelled, haversine miles (e.g., straight-line miles), ratio of haversine miles to total miles, and the like.

At step 208, the driving assessment application 117 may instruct the mobile device 120 to transmit the isolated actionable trip data to driving assessment server 130 as one or more electronic signals. By isolating the actionable trip data from the totality of vehicle operational data and vehicle locational information at mobile device 120 and prior to transmission, bandwidth of network 150 may be conserved as the amount of data transmitted between mobile device 120 and driving assessment server 130 is minimized. In some instances, the mobile device 120 may not isolate the actionable trip data from the vehicle operational data and the vehicle locational information at step 207 and, as such, a larger portion of the vehicle operational data and the vehicle locational information may be transmitted at step 208. In such instances, the unlocking events of the mobile device 120 during operation of vehicle 110, regardless whether or not vehicle 110 had a velocity greater than a first predetermined velocity threshold, may be included in the transmission. At step 209, the driving assessment server 130 may receive the one or more electronic signals corresponding to the vehicle operational data and vehicle locational information in the condensed form (e.g., isolated actionable data) and/or the full form.

In instances in which the full form of the vehicle operational data and vehicle locational information was received, the driving assessment server 130 may identify the actionable data at step 210 in a manner similar to that performed, in some instances, by mobile device 120 at step 207. In particular, the vehicle operational data analysis engine 133b of the driving assessment server 130 may isolate actionable data associated with the vehicle operational data (e.g., velocity events, acceleration events, braking events, unlocking events of the mobile device 120 periods in which the vehicle 110 had a velocity greater than a predetermined velocity threshold, and the like) and vehicle locational data analysis engine 133c of the driving assessment server 130 may isolate actionable data associated with the vehicle locational information (e.g., starting and destination information, a time range, a time of day, a day of week, miles traveled during the night, total miles traveled, route data, roads travelled, haversine miles, ratio of haversine miles to total miles, and the like). Conversely, in instances in which the isolated actionable data was received, the driving assessment server 130 may proceed to step 211.

Figure 2C:
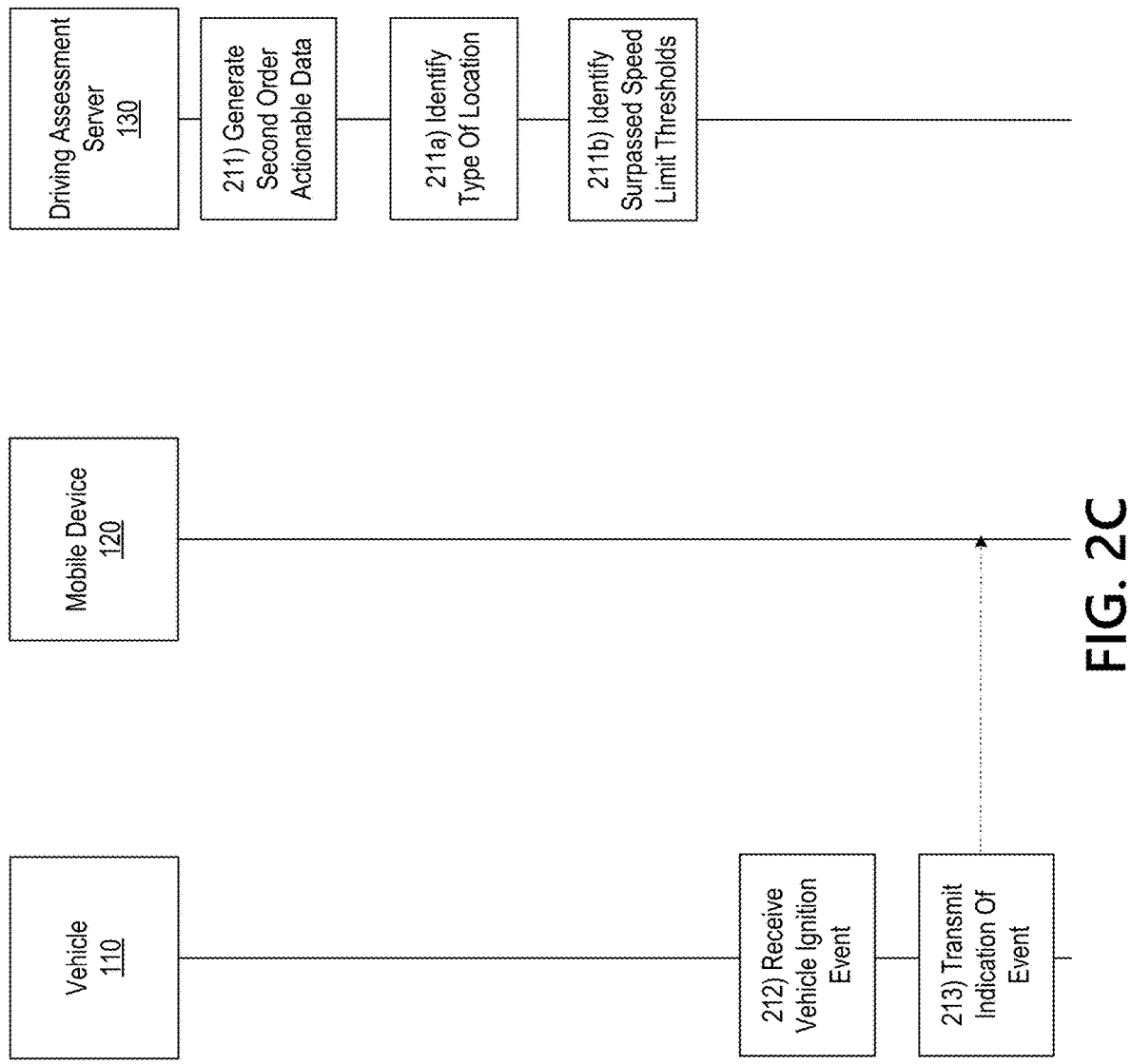

Referring to FIG. 2C and step 211, the inter-operative analysis engine 133d of the driving assessment server 130 may generate second order actionable data based off of the actionable data isolated by mobile device 120 and/or identified by vehicle operational data analysis engine 133b and vehicle locational data analysis engine 133c. In some instances, the generation of the second order actionable data by inter-operative analysis engine 133d may be performed in conjunction with additional data from historical information database 133g and/or third party computing devices 140.

For example, at step 211a, inter-operative analysis engine 133d may identify, based on the destination information isolated by mobile device 120 and/or identified by vehicle locational data analysis engine 133c, a type of location (e.g., home, restaurants, bars, schools, churches, banks, ATMs, daycares, gyms, sporting arenas, and the like) associated with the destination information. The identification may be performed by comparing the destination information isolated by mobile device 120 and/or identified by vehicle locational data analysis engine 133c with historical destination information stored in historical information database 133g. Additionally and/or alternatively, the inter-operative analysis engine 133d may query a third party computing device 140 related to the management of locational information.

At step 211b, the inter-operative analysis engine 133d may identify, based on the one or more roads isolated by the mobile device 120 and/or identified by the vehicle locational data analysis engine 133c, speed limits associated with each of the one or more roads and compare the vehicle operational data (e.g., vehicle velocity data) with the speed limits associated with each of the one or more roads to identify a number of miles driven, percentage of miles driven, and/or time driven by the vehicle 110 during the trip where the velocity of the vehicle 110 was greater than a predetermined velocity threshold (e.g., 10 mph, 15 mph, or the like) over the corresponding speed limit of the road. In some instances, such calculations may be based off of, and/or include, actual and/or expected aggregate traffic velocity data associated with each of the one or more roads identified. The identification of the speed limits associated with the roads may be performed by comparing the information corresponding to the one or more roads isolated by mobile device 120 and/or identified by vehicle locational data analysis engine 133c with historical destination information stored in historical information database 133g. Additionally and/or alternatively, the inter-operative analysis engine 133d may query a third party computing device 140 related to the management of traffic regulation information.

Additionally and/or alternatively, advanced metrics regarding the velocity data may be used in the comparisons with the speed limits associated with each of the one or more roads to identify a number of miles driven, percentage of miles driven, and/or time driven by the vehicle 110 during the trip where the velocity of the vehicle 110 was greater than a predetermined velocity threshold (e.g., 10 mph, 15 mph, or the like) over the corresponding speed limit of the road. For example, such advanced metrics may apply a weight and/or functional transformation of the vehicle velocity data in relation to the speed limits associated with each of the one or more roads to yield an advanced vehicle velocity relative to the speed limits. In some instances, the functional transformation may identify the maximum vehicle velocity above the speed limit and apply a square to the difference (e.g., max(vehicle_velocity−speed_limit,0)^2). Further, the advanced metrics regarding the vehicle velocity may be based off of, and/or include, actual and/or expected aggregate traffic velocity data associated with each of the one or more roads identified.

At step 212, vehicle 110 may receive a negative vehicle ignition event (e.g., key turn and/or button press turning engine off) from a driver of vehicle 110. At step 213, one or more of vehicle sensors 111, GPS 112, telematics device 113, and/or on-board computer 115 by way of vehicle communication system 114 of vehicle 110 may transmit an indication of the negative vehicle ignition event to mobile device 120. The transmission may be performed through the communication interface paired at step 201.

Figure 2D:
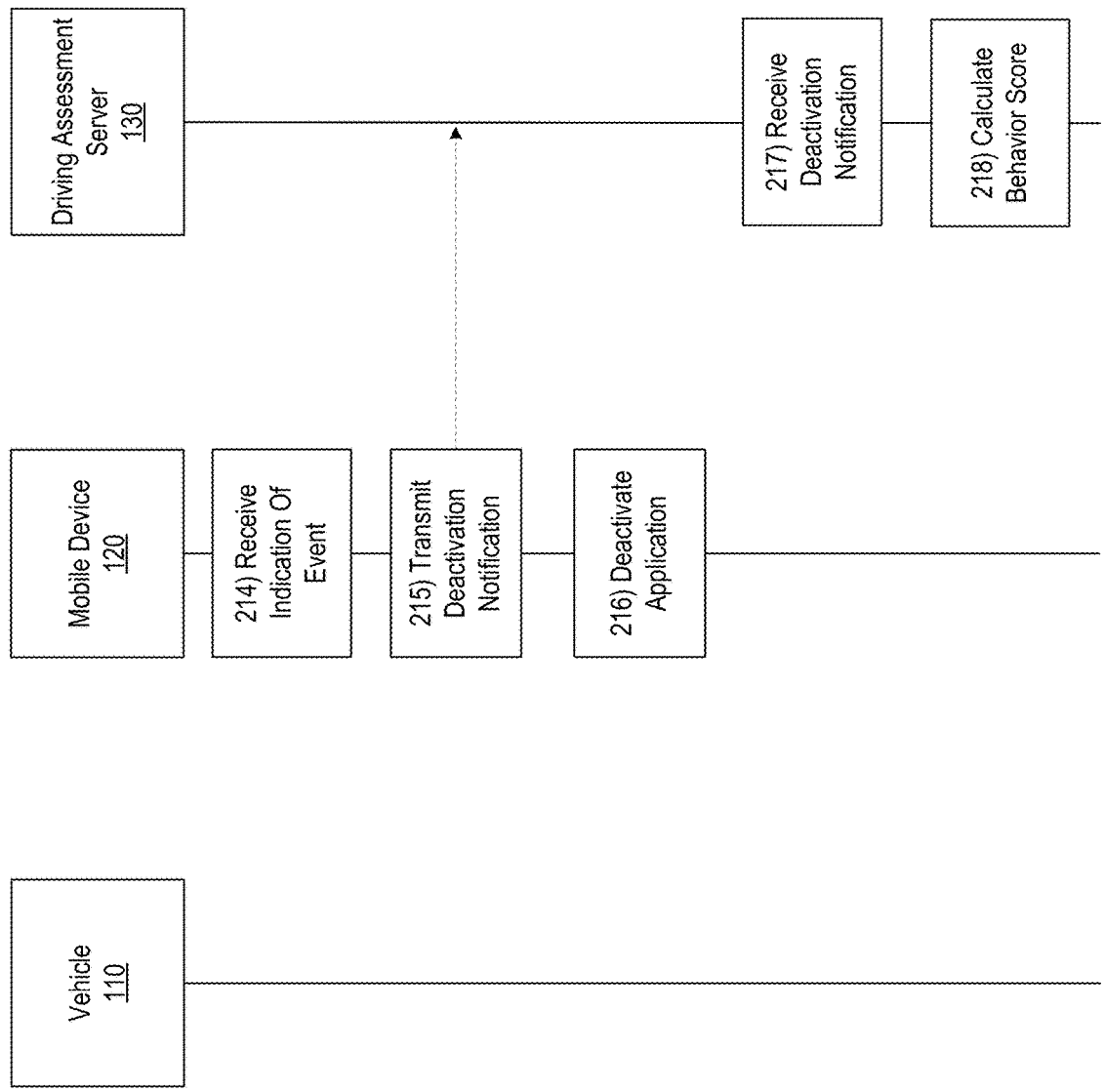

Referring to FIG. 2D, at step 214, the mobile device 120 may receive the indication of the negative vehicle ignition event from one or more of vehicle sensors 111, GPS 112, telematics device 113, and/or on-board computer 115 of vehicle 110 through the paired short-range communication interface. In some instances, the indication of the negative vehicle ignition event may further serve as an indication of trip conclusion. At step 215, the mobile device 120 may transmit a deactivation notification to driving assessment server 130. At step 216, the mobile device 120 may close and/or deactivate the driving assessment application 117 in response to receiving the indication of the negative vehicle ignition event.

By activating and deactivating the driving assessment application 117 responsive to respectively receiving the positive and negative vehicle ignition events, technological improvements may be achieved such as minimizing power consumption on mobile device 120 by the driving assessment application 117, increasing bandwidth availability of network 150 by reducing the likelihood of non-driving-related data transmissions from mobile device 120 to driving assessment server 130, and increasing processing efficiency at mobile device 120 and driving assessment server 130 by reducing the volume of processing from non-driving-related data transmissions.

Additionally and/or alternatively, other measures may be used to identify the termination of a vehicle trip. For example, processes such as geofencing, fused sensing, GPS-based speed threshold analysis, and the like may be used alone or in combination to identify trip termination. Further, such processes may be analyzed through machine learning algorithms to filter out false trip terminations and identify true trip termination. In some instances, the mobile device 120 may close and/or deactivate the driving assessment application 117 in response to a direct input provided to mobile device 120 by the driver of vehicle 110. In such instances, the deactivation notification provided at step 215 to driving analysis server 130 may be provided before deactivation occurs.

At step 217, the driving assessment server 130 may receive the deactivation notification from mobile device 120. At step 218, the driver behavior score module 133e of driving assessment server 130 may calculate a behavior score for the driver of vehicle 110 for the trip based on the actionable trip data of vehicle operational data and vehicle locational information isolated by mobile device 120 and/or indicated by vehicle operational data analysis engine 133b and vehicle locational data analysis engine 133c, as well as the second order actionable data generated by inter-operative analysis engine 133d.

In particular, the behavior score may be calculated for the trip based on one or more of the type of location associated with the destination information, time range, time of day, day of week, number of miles traveled during the night, number of velocity events, number of braking events, number of unlocking events of the mobile device 120 during periods in which the vehicle 110 had a velocity greater than a first predetermined velocity threshold, the amount of time the vehicle 110 traveled greater than a second predetermined velocity threshold, the number of braking events greater than a predetermined deceleration threshold when the velocity of the vehicle 110 was greater than a third predetermined velocity threshold, percentage of miles driven by the vehicle 110 during the trip where the velocity of the vehicle 110 was greater than a fourth predetermined velocity threshold over the corresponding speed limit associated with a road on which the vehicle 110 was driving, and/or the ratio between the straight-line distance associated with the trip and the total distance travelled by the vehicle 110 during the trip.

In some instances, the driver behavior score module 133e may utilize machine learning algorithms such as logistic regression, ordinary least squares, linear regression, k-means clustering, naïve Bayes classifier, adaptive boosting, and the like from machine learning engine 133d to aide in generating the behavior score. As such, the machine learning engine 133d may have or include instructions that direct and/or cause driving assessment server 130 to apply computational weights to certain parameters used in calculating the behavior score based on the efficacy or lack thereof of previous behavior score calculations in reflecting the likelihood of the driver being involved in an accident.

Referring to FIG. 2E and step 219, the driver behavior score module 133e of driving assessment server 130 may use the behavior score to categorize the driver based on the likelihood of being involved in an accident. As stated above, the behavior score may indicate the likelihood of the driver being involved in an accident, where a low behavior score (e.g., 1) may indicate a low probability of the driver being in an accident and a high behavior score (e.g., 100) may indicate a high probability of the driver being involved in an accident. Drivers within a first range of behavior scores (e.g., 1-10) may be identified with a first class or category of insurance policies with low premiums, drivers within a second range of behavior scores (e.g., 11-20) may be identified with a second class or category of insurance policies with higher premiums than the first class, drivers within a third range of behavior scores (e.g., 21-30) may be identified with a third class or category of insurance policies with higher premiums than the second class, and so on.

At step 220, the driver behavior score module 133e of driving assessment server 130 may identify an insurance policy for the driver based on the insurance policy class or category corresponding to the behavior score categorization. At step 221, the driver behavior score module 133e may store the data (e.g., vehicle operational information, vehicle locational information, actionable trip data, second order actionable trip data, machine learning algorithms and weights, driver behavior score, driver behavior score categorization, and insurance policy) in historical information database 133g.

Figure 3A:
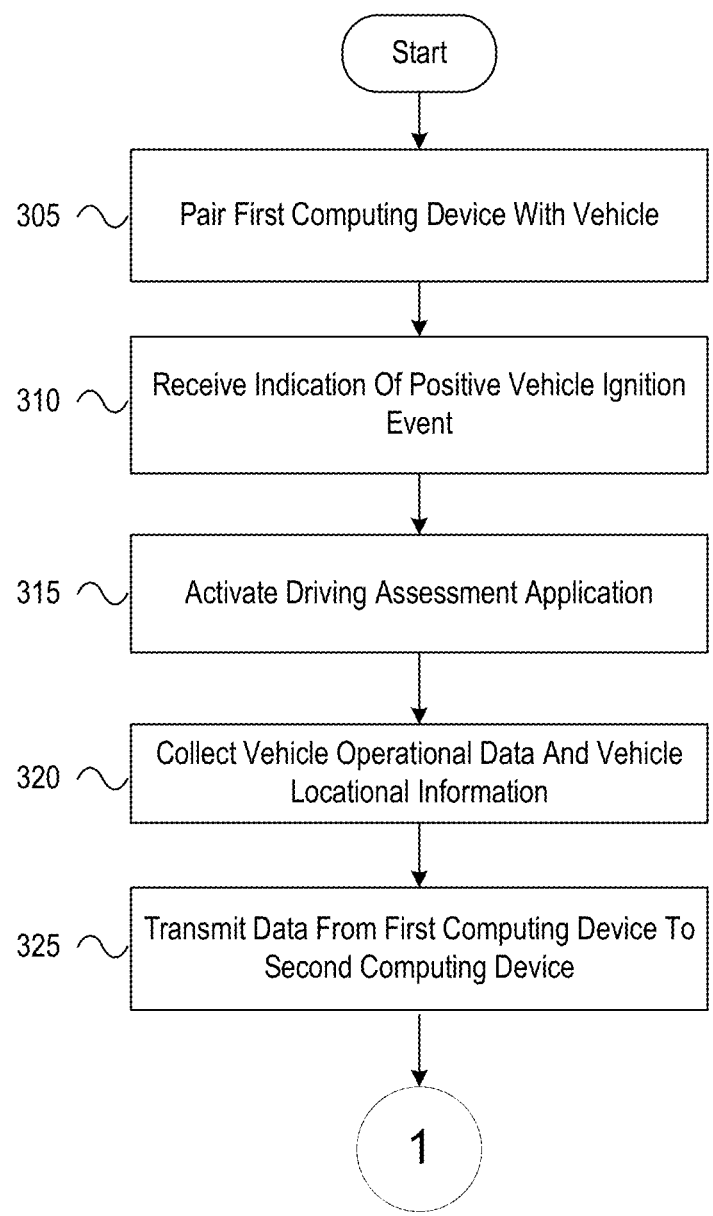
FIGS. 3A and 3B respectively illustrate a first and second example method for vehicle telematics based driving assessment in accordance with one or more aspects of the disclosure.
Figure 3B:
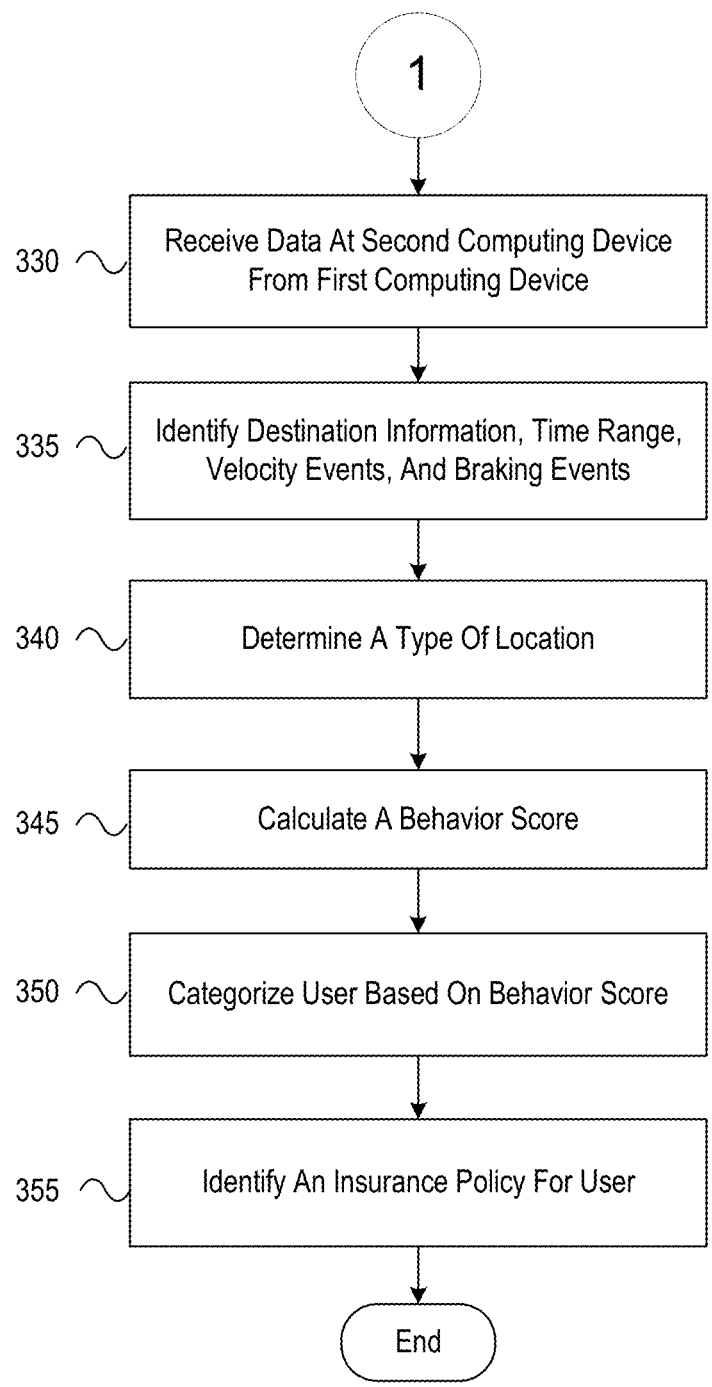

FIGS. 3A and 3B illustrate one example method for vehicle telematics based driving assessment in accordance with one or more example embodiments. Referring to FIG. 3A, at step 305, a first computing device having a first processor, first short-range communication interface, first long-range communication interface, first accelerometer, first GPS, and first memory, may pair, via the first short-range communication interface, with a vehicle control computer associated with a vehicle by way of a communication interface of the vehicle control computer. At step 310, the first computing device may receive, by the first short-range communication device and from the vehicle, an indication of a positive vehicle ignition event. At step 315, responsive to receiving the indication of the positive vehicle ignition event, the first computing device may activate a driving assessment application. At step 320, the first computing device may collect, by one or more of the first accelerometer and the first GPS, vehicle operational data and vehicle locational information associated with the vehicle and corresponding to a trip of the vehicle via the driving assessment application. At step 325, the first computing device may transmit, by the first long-range communication interface to a second computing device, the vehicle operational data and vehicle locational information associated with the vehicle Referring to FIG. 3B and step 330, the second computing device having a second processor, second communication communication interface, and second memory, may receive, by the second communication interface and from the first computing device, the vehicle operational data and vehicle locational information. At step 335, the second computing device may identify, based on the vehicle operational data and vehicle locational information, one or more of destination information corresponding to the trip, a time range of the trip, velocity events that occurred during the trip, and braking events that occurred during the trip. At step 340, the second computing device may determine, based on the destination information corresponding to the trip, a type of location associated with the destination information. At step 345, the second computing device may calculate, based on one or more of the type of location, the time range, velocity events, and/or braking events, a behavior score for the trip. At step 350, the second computing device may categorize the user of the vehicle based on the calculated behavior score for the trip. At step 355, the second computing device may identify an insurance policy for the user based on the categorization.

The present disclosure enables telematics data to be generated at a mobile device while providing technological improvements as compared to existing systems. In particular, through activating and deactivating the driving assessment application responsive to respectively receiving positive and negative vehicle ignition events, the disclosure serves to minimize power consumption on the mobile device by the driving assessment application, increase bandwidth availability of a connected network by reducing the likelihood of non-driving-related data transmissions from the mobile device to the driving assessment server, and increase processing efficiency at the mobile device and driving assessment server by reducing the volume of processing from non-driving-related data transmissions. Furthermore, in instances in which the actionable trip data is isolated from the totality of vehicle operational data and vehicle locational information by the mobile device, bandwidth availability is further increased because of the reduction in data transmissions by the mobile device to the driving assessment server. Such aspects of the disclosure address major technological deficiencies in existing systems and, accordingly, provide meaningful technological improvements.

FIG. 4 illustrates a block diagram of a driving assessment computing device 401 in a system that may be used according to one or more illustrative embodiments of the disclosure. The driving assessment computing device 401 may have a processor 403 for controlling overall operation of a driving assessment computing device 401 and its associated components, including RAM 405, ROM 407, input/output module 409, and memory unit 415. The driving assessment computing device 401, along with one or more additional devices (e.g., terminals 441, 451) may correspond to any of multiple systems or devices, such as driving assessment systems, configured as described herein for performing methods corresponding to the usage of vehicle telematics data to assess parameters associated with vehicle operation.

Input/Output (I/O) module 409 may include a microphone, keypad, touch screen, and/or stylus through which a user of the driving assessment computing device 401 may provide input, and may also include one or more of a speaker for providing audio input/output and a video display device for providing textual, audiovisual and/or graphical output. Software may be stored within memory unit 415 and/or other storage to provide instructions to processor 403 for enabling driving assessment computing device 401 to perform various functions. For example, memory unit 415 may store software used by the driving assessment computing device 401, such as an operating system 417, application programs 419, and an associated internal database 421. The memory unit 415 includes one or more of volatile and/or non-volatile computer memory to store computer-executable instructions, data, and/or other information. Processor 403 and its associated components may allow the driving assessment computing device 401 to execute a series of computer-readable instructions to perform the one or more of the processes or functions described herein.

The driving assessment computing device 401 may operate in a networked environment 400 supporting connections to one or more remote computers, such as terminals/devices 441 and 451. Driving assessment computing device 401, and related terminals/devices 441 and 451, may include devices installed in vehicles and/or homes, mobile devices that may travel within vehicles and/or may be situated in homes, or devices outside of vehicles and/or homes that are configured to perform aspects of the processes described herein. Thus, the driving assessment computing device 401 and terminals/devices 441 and 451 may each include personal computers (e.g., laptop, desktop, or tablet computers), servers (e.g., web servers, database servers), vehicle-based devices (e.g., on-board vehicle computers, short-range vehicle communication systems, sensors, and telematics devices), or mobile communication devices (e.g., mobile phones, portable computing devices, and the like), and may include some or all of the elements described above with respect to the driving assessment computing device 401. The network connections depicted in FIG. 4 include a local area network (LAN) 425 and a wide area network (WAN) 429, and a wireless telecommunications network 433, but may also include other networks. When used in a LAN networking environment, the driving assessment computing device 401 may be connected to the LAN 425 through a network interface or adapter 423. When used in a WAN networking environment, the driving assessment computing device 401 may include a modem 427 or other means for establishing communications over the WAN 429, such as network 431 (e.g., the Internet). When used in a wireless telecommunications network 433, the driving assessment computing device 401 may include one or more transceivers, digital signal processors, and additional circuitry and software for communicating with wireless computing devices 441 (e.g., mobile phones, short-range vehicle communication systems, vehicle sensing and telematics devices) via one or more network devices 435 (e.g., base transceiver stations) in the wireless network 433.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and components described herein may be configured to communicate using any of these network protocols or technologies.

Additionally, one or more application programs 419 used by the computing device 401 may include computer executable instructions for receiving data and performing other related functions as described herein.

As will be appreciated by one of skill in the art, the various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A driving assessment system, comprising:
   a first computing device associated with a user in a vehicle, the first computing device including:
   a first processor;
   a first long-range communication interface communicatively coupled to the first processor;
   a first accelerometer communicatively coupled to the first processor;
   a first global positioning system (GPS) communicatively coupled to the first processor; and
   first memory storing computer-readable instructions that, when executed by the first processor, cause the first computing device to:
   collect, by one or more of the first accelerometer and the first GPS, vehicle operational data and vehicle locational information associated with the vehicle and corresponding to a trip of the vehicle;
   identify, from the collected vehicle operational data, one or more periods in which the vehicle had a velocity greater than a first predetermined velocity threshold;
   determine a number of unlocking events of the first computing device during the one or more periods; and
   transmit, by the first long-range communication interface to a second computing device, the number of unlocking events, the vehicle operational data and vehicle locational information associated with the vehicle; and
   the second computing device located remotely from the first computing device, the second computing device including:
   a second processor;
   a second communication interface communicatively coupled to the second processor; and
   second memory storing computer-readable instructions that, when executed by the second processor, cause the second computing device to:
   receive, by the second communication interface and from the first computing device, the vehicle operational data and vehicle locational information;
   identify, based on the vehicle operational data and vehicle locational information, one or more of destination information corresponding to the trip, a time range of the trip, velocity events that occurred during the trip, and braking events that occurred during the trip;

determine, based on the destination information corresponding to the trip, a type of location associated with the destination information; and calculate, based on one or more of the type of location, the time range, velocity events, and braking events, a behavior score for the trip.

2. The driving assessment system of claim 1, wherein the first computing device further includes:

a first short-range communication interface communicatively coupled to the first processor and wherein the first memory stores further computer-readable instructions that, when executed by the first processor, cause the first computing device to:

pair, via the first short-range communication interface, with a vehicle control computer associated with the vehicle by way of a communication interface of the vehicle control computer;

receive, by the first short-range communication interface and from the vehicle control computer, an indication of a positive vehicle ignition event; and responsive to receiving the indication of the positive vehicle ignition event, activate a driving assessment application on the first computing device, wherein the collecting, by one or more of the first accelerometer and the first GPS, vehicle operational data and vehicle locational information associated with the vehicle and corresponding to the trip of the vehicle is performed via the driving assessment application.

3. The driving assessment system of claim 2, wherein the first memory stores further computer-readable instructions that, when executed by the first processor, cause the first computing device to:

receive, by the first short-range communication interface and from the vehicle control computer, an indication of a negative vehicle ignition event; and responsive to receiving the indication of the negative vehicle ignition event, deactivate the driving assessment application on the first computing device.

4. The driving assessment system of claim 1, wherein the second memory stores further computer-readable instructions that, when executed by the second processor, cause the second computing device to:

receive, by the second communication interface and from the first computing device, the number of unlocking events of the first computing device during one or more periods, wherein the calculating the behavior score for the trip further includes the number of unlocking events.

5. The driving assessment system of claim 1, wherein the second memory stores further computer-readable instructions that, when executed by the second processor, cause the second computing device to:

identify, based on the vehicle operational data and vehicle locational information, a time of day associated with the trip, a day of week associated with the trip, and a number of miles traveled during the night, wherein the calculating the behavior score for the trip further includes the time of day, the day of week, and the number of miles traveled during the night.

6. The driving assessment system of claim 1, wherein the second memory stores further computer-readable instructions that, when executed by the second processor, cause the second computing device to:

identify, based on the vehicle operational data and vehicle locational information, an amount of time the vehicle traveled greater than a second predetermined velocity threshold and a number of braking events greater than a predetermined deceleration threshold when the velocity of the vehicle was greater than a third predetermined velocity threshold, wherein the calculating the behavior score for the trip further includes the amount of time the vehicle traveled greater than the second predetermined velocity threshold and the number of braking events greater than the predetermined deceleration threshold when the velocity of the vehicle was greater than the third predetermined velocity threshold.

7. The driving assessment system of claim 1, wherein the second memory stores further computer-readable instructions that, when executed by the second processor, cause the second computing device to:

determine, based on the vehicle locational information, one or more roads the vehicle travelled on during the trip;

identify, based on the one or more roads, speed limits associated with each of the one or more roads; and compare the vehicle operational data with the speed limits associated with each of the one or more roads to identify a percentage of miles driven by the vehicle during the trip where a velocity of the vehicle was greater than a fourth predetermined velocity threshold over a corresponding speed limit, wherein the calculating the behavior score for the trip further includes the percentage of miles driven by the vehicle during the trip where the velocity of the vehicle was greater than the fourth predetermined velocity threshold over the corresponding speed limit.

8. The driving assessment system of claim 1, wherein the second memory stores further computer-readable instructions that, when executed by the second processor, cause the second computing device to:

identify, based on the vehicle locational information, starting information corresponding to the trip;

compare the starting information with the destination information to determine a straight-line distance associated with the trip;

determine, based on the vehicle locational information, a total distance travelled by the vehicle during the trip; and calculate a ratio between the straight-line distance associated with the trip and the total distance travelled by the vehicle during the trip, wherein the calculating the behavior score for the trip further includes the ratio between the straight-line distance associated with the trip and the total distance travelled by the vehicle during the trip.

9. The driving assessment system of claim 1, wherein the second memory stores further computer-readable instructions that, when executed by the second processor, cause the second computing device to:

categorize the user of the vehicle based on the calculated behavior score for the trip.

10. A method comprising:

pairing, by a first computing device via a short-range communication interface of the first computing device, with a vehicle control computer associated with a vehicle by way of a communication interface of the vehicle control computer;

receiving, by the short-range communication interface and from the vehicle control computer, an indication of a positive vehicle ignition event;

responsive to receiving the indication of the positive vehicle ignition event, activating a driving assessment application on the first computing device;

collecting, by one or more of an accelerometer and an GPS via the driving assessment application, vehicle operational data and vehicle locational information associated with the vehicle and corresponding to a trip of the vehicle;

identifying, based on the vehicle operational data and vehicle locational information, one or more periods in which the vehicle had a velocity greater than a first predetermined velocity threshold, one or more of destination information corresponding to the trip, a time range of the trip, velocity events, and braking events that occurred during the trip;

determining a number of unlocking events of the first computing device during the one or more periods; and transmitting, by a long-range communication interface to a second computing device, the number of unlocking events of the first computing device during the one or more periods.

11. The method of claim 10, further comprising:

transmitting, by the long-range communication interface to the second computing device, the identified one or more of the destination information corresponding to the trip, the time range of the trip, the velocity events, and the braking events that occurred during the trip.

12. The method of claim 10, further comprising:

receiving, by the short-range communication interface and from the vehicle control computer, an indication of a negative vehicle ignition event; and responsive to receiving the indication of the negative vehicle ignition event, deactivating the driving assessment application on the first computing device.

13. A method comprising:

receiving, by a second computing device via a communication interface and from a first computing device, a number of unlocking events of the first computing device and vehicle operational data and vehicle locational information associated with a vehicle and corresponding to a trip, wherein the number of unlocking events of the first computing device corresponds to one or more periods in which the vehicle had a velocity greater than a first predetermined velocity threshold;

identifying, based on the vehicle operational data and vehicle locational information, one or more of destination information corresponding to the trip, a time range of the trip, velocity events, and braking events that occurred during the trip;

determining, based on the destination information corresponding to the trip, a type of location associated with the destination information; and calculating, based on one or more of the number of unlocking events, the type of location, the time range, the velocity events, and the braking events, a behavior score for the trip.

14. The method of claim 13, further comprising:

identifying, based on the vehicle operational data and vehicle locational information, an amount of time the vehicle traveled greater than a second predetermined velocity threshold and a number of braking events greater than a predetermined deceleration threshold when the velocity of the vehicle was greater than a third predetermined velocity threshold, wherein the calculating the behavior score for the trip further includes the amount of time the vehicle traveled greater than the second predetermined velocity threshold and the number of braking events greater than the predetermined deceleration threshold when the velocity of the vehicle was greater than the third predetermined velocity threshold.

15. The method of claim 13, further comprising:

identifying, based on the vehicle locational information, starting information corresponding to the trip;

comparing the starting information with the destination information to determine a straight-line distance associated with the trip;

determining, based on the vehicle locational information, a total distance travelled by the vehicle during the trip; and calculating a ratio between the straight-line distance associated with the trip and the total distance travelled by the vehicle during the trip, wherein the calculating the behavior score for the trip further includes the ratio between the straight-line distance associated with the trip and the total distance travelled by the vehicle during the trip.

16. The method of claim 13, further comprising:

identifying, based on the vehicle operational data and vehicle locational information, a time of day associated with the trip, a day of week associated with the trip, and a number of miles traveled during the night, wherein the calculating the behavior score for the trip further includes the time of day, the day of week, and the number of miles traveled during the night.

17. The method of claim 13, further comprising:

determining, based on the vehicle locational information, one or more roads the vehicle travelled on during the trip;

identifying, based on the one or more roads, speed limits associated with each of the one or more roads; and comparing the vehicle operational data with the speed limits associated with each of the one or more roads to identify a percentage of miles driven by the vehicle during the trip where a velocity of the vehicle was greater than a fourth predetermined velocity threshold over a corresponding speed limit, wherein the calculating the behavior score for the trip further includes the percentage of miles driven by the vehicle during the trip where the velocity of the vehicle was greater than the fourth predetermined velocity threshold over the corresponding speed limit.

* * * * *